United States Patent
Yadav et al.

(10) Patent No.: US 10,440,510 B2
(45) Date of Patent: Oct. 8, 2019

(54) METHOD AND SYSTEM FOR TRACKING LOCATION OF AN ELECTRONIC DEVICE

(71) Applicant: SAMSUNG ELECTRONICS CO., LTD., Suwon-si (KR)

(72) Inventors: Vishwesh Kumar Yadav, Baramadpur (IN); Rajeshwar Patra, Dahigora (IN); Sumit Gupta, Bathinda (IN); Ekta Anil Pradeep Sachdev, Mumbai (IN); Rajat Jain, Phagwara (IN); Aditi Jain, Jaipur (IN); Ankur Sardana, New Delhi (IN); Pragam Rathore, Bareilly (IN); Ashoka Prem, Kayamkulam (IN); Ritesh kumar Sinha, Munger (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 14/851,077

(22) Filed: Sep. 11, 2015

(65) Prior Publication Data

US 2016/0080921 A1    Mar. 17, 2016

(30) Foreign Application Priority Data

Sep. 12, 2014    (IN) .......................... 2639/DEL/2014
Aug. 25, 2015    (KR) ........................ 10-2015-0119582

(51) Int. Cl.
*H04W 4/06* (2009.01)
*H04W 76/00* (2018.01)
*H04W 4/02* (2018.01)
*H04W 64/00* (2009.01)
*H04W 4/90* (2018.01)
*H04W 4/80* (2018.01)
(Continued)

(52) U.S. Cl.
CPC ............. *H04W 4/023* (2013.01); *H04W 4/80* (2018.02); *H04W 4/90* (2018.02); *H04W 64/006* (2013.01); *H04W 76/50* (2018.02); *H04W 84/12* (2013.01)

(58) Field of Classification Search
CPC ....... H04W 4/22; H04W 4/008; H04W 4/023; H04W 76/007; H04W 64/00; H04W 88/06; H04W 4/12; H04W 76/023; H04W 84/12; H04M 1/72536
USPC ..................... 455/414.1, 436, 456.1–456.6
See application file for complete search history.

(56) References Cited

U.S. PATENT DOCUMENTS 9,654,960 B2 * 5/2017 Zhou .................. H04W 76/14
2009/0103503 A1   4/2009 Chhabra
(Continued)

OTHER PUBLICATIONS

Communication dated Dec. 17, 2015, issued by the International Searching Authority in counterpart International Application No. PCT/KR2015/009580 (PCT/ISA/210).
(Continued)

*Primary Examiner* — Khawar Iqbal
(74) *Attorney, Agent, or Firm* — Sughrue Mion, PLLC

(57) ABSTRACT

A method of tracking location of an electronic device includes broadcasting a communication signal in a first short range wireless communication mode; and receiving location information of a second electronic device in a second short range wireless communication mode switched to, from the first short range wireless communication mode, the location information of the second electronic device being detected by using the broadcasted communication signal.

8 Claims, 19 Drawing Sheets

(51) Int. Cl.
*H04W 84/12* (2009.01)
*H04W 76/50* (2018.01)

(56) References Cited

U.S. PATENT DOCUMENTS

| | | | | |
|---|---|---|---|---|
| 2010/0283679 | A1* | 11/2010 | Levy | G01S 5/02 |
| | | | | 342/357.49 |
| 2010/0304674 | A1 | 12/2010 | Kim et al. | |
| 2011/0111726 | A1* | 5/2011 | Kholaif | G01S 1/68 |
| | | | | 455/404.2 |
| 2012/0165035 | A1* | 6/2012 | Chen | H04L 51/20 |
| | | | | 455/456.1 |
| 2012/0265823 | A1* | 10/2012 | Parmar | H04W 4/21 |
| | | | | 709/206 |
| 2013/0115892 | A1 | 5/2013 | Kurz | |
| 2013/0143576 | A1* | 6/2013 | Kurz | G01S 5/0289 |
| | | | | 455/440 |
| 2013/0203383 | A1* | 8/2013 | Stopel | H04W 12/08 |
| | | | | 455/411 |
| 2013/0281110 | A1* | 10/2013 | Zelinka | G01S 5/0284 |
| | | | | 455/456.1 |
| 2013/0281122 | A1* | 10/2013 | Zelinka | H04W 64/00 |
| | | | | 455/456.3 |
| 2013/0308618 | A1 | 11/2013 | Panneerselvam | |
| 2014/0105198 | A1 | 4/2014 | Banerjea et al. | |
| 2014/0141804 | A1* | 5/2014 | Zelinka | G01S 5/0284 |
| | | | | 455/456.2 |
| 2014/0213186 | A1* | 7/2014 | Gage | H04W 4/21 |
| | | | | 455/41.2 |
| 2015/0304983 | A1* | 10/2015 | Krening | H04W 64/003 |
| | | | | 370/254 |
| 2015/0350855 | A1* | 12/2015 | Huang | H04W 76/14 |
| | | | | 455/426.1 |
| 2015/0379114 | A1* | 12/2015 | Onishi | G08G 1/096716 |
| | | | | 707/737 |
| 2017/0027009 | A1* | 1/2017 | Dumpala | H04B 7/15507 |
| 2017/0251507 | A1* | 8/2017 | Fodor | H04W 76/14 |
| 2017/0273140 | A1* | 9/2017 | Ryu | H04W 84/12 |

OTHER PUBLICATIONS

Communication issued by the European Patent Office dated Jul. 24, 2017 in counterpart European Patent Application No. 15839224.1.
Communication dated Mar. 15, 2018, issued by the European Patent Office in counterpart European Patent Application No. 15839224.1.
Communication dated Mar. 19, 2019 issued by the European Intellectual Property Office in counterpart European Application No. 15 839 224.1.

* cited by examiner

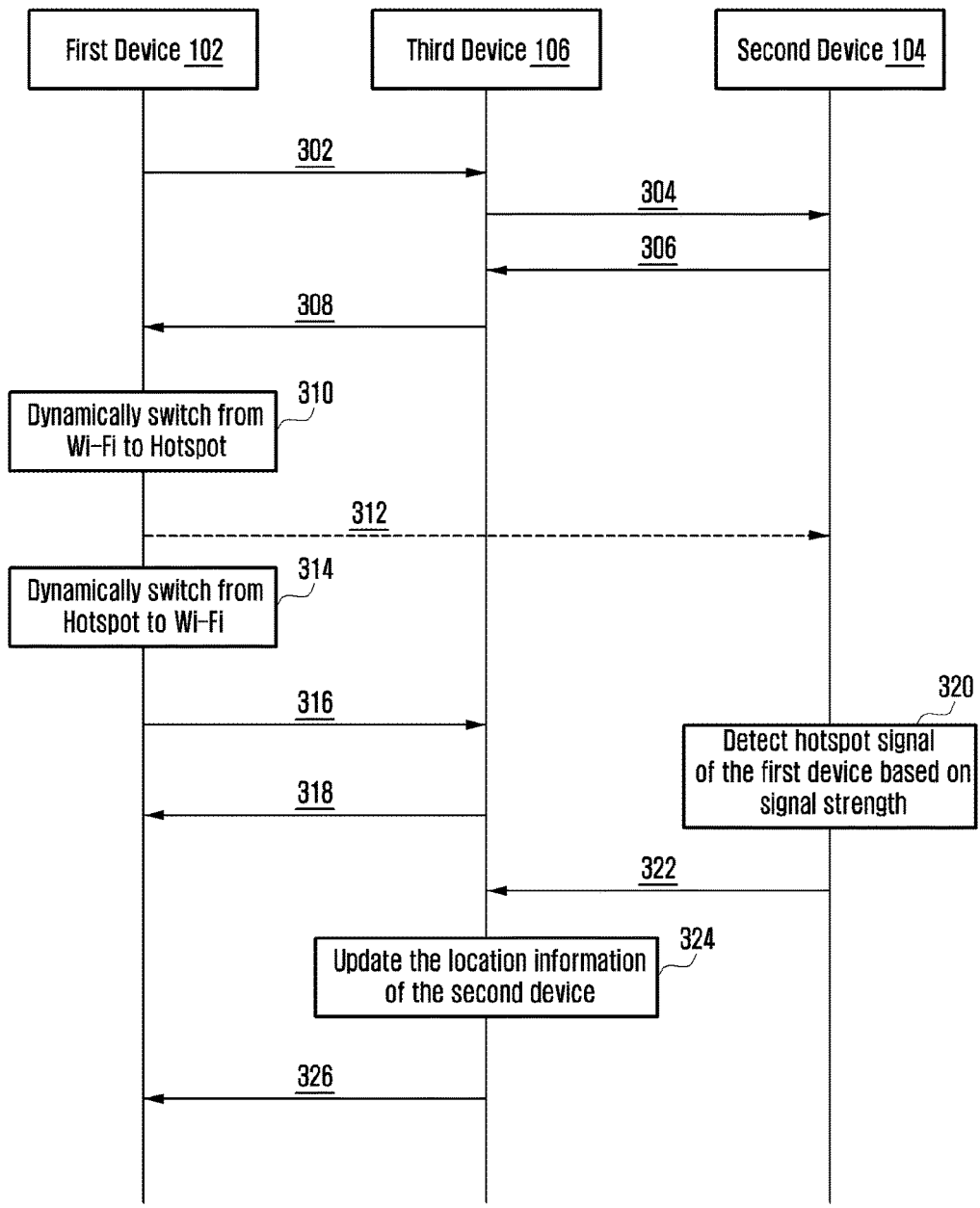

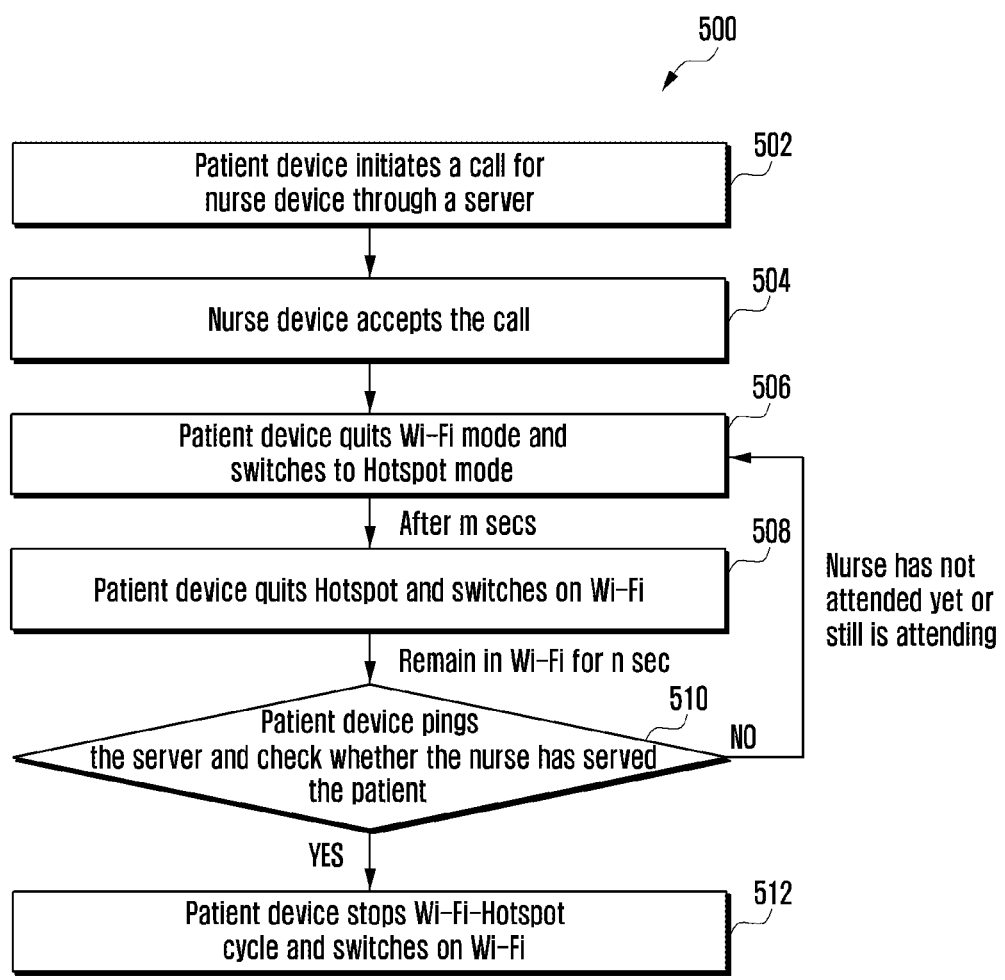

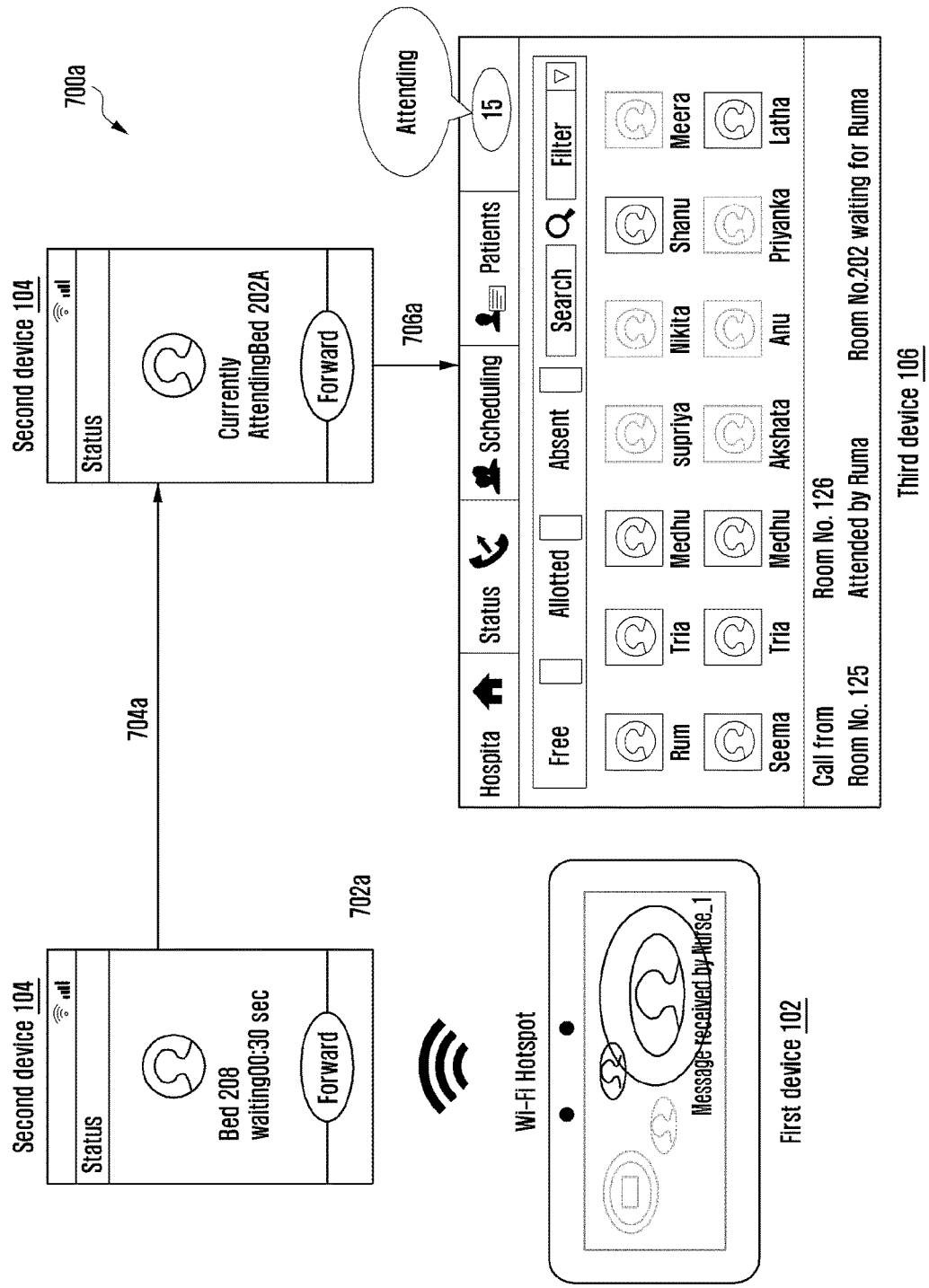

METHOD AND SYSTEM FOR TRACKING LOCATION OF AN ELECTRONIC DEVICE

CROSS-REFERENCE TO RELATED APPLICATION(S)

This application claims priority from Indian Provisional Patent Application No. 2639/DEL/2014, filed on Sep. 12, 2014, in the Indian Patent Office, Indian Complete Patent Application No. 2639/DEL/2014, filed on Jun. 24, 2015, in the Indian Patent Office, and Korean patent application No. 10-2015-0119582, filed on Aug. 25, 2015, in the Korean Intellectual Property Office, the disclosures of which are hereby incorporated in their entireties by reference.

BACKGROUND

1. Field

Systems, apparatuses, and methods consistent with exemplary embodiments relate to location tracking of an electronic device, and more particularly, to tracking, by a first electronic device, location information of a second electronic device by using a third electronic device.

2. Description of the Related Art

Location tracking systems can be divided into systems for an indoor environment and systems for an outdoor environment. Location tracking in an indoor environment may be used in various applications. For example, the location of exhibits in a museum can be detected by using a navigation application. That is, a visitor can detect information on a current location of the visitor and the location of exhibits using map information of the museum and personalized navigation information. As another example, the locations of doctors and nurses in a hospital may be shared over a network among hospital staff to improve medical support, particularly in the event of an emergency. As yet another example, an environment in which a shopper can obtain price information, etc. at a current location in a shopping mall or a department store can be created, and thus a business model such as a content providing service can be supported.

Location tracking systems in an indoor environment include vision-based systems using a camera and sensor-based systems using an infrared sensor. However, vision-based systems are disadvantageous because the vision-based systems raise privacy concerns and require heavy computation. Accordingly, sensor-based location tracking systems are actively developed.

Although the sensor-based location tracking systems provide outcomes in tracking a person or a device in a specific environment, the sensor-based location tracking systems require installation of a plurality of devices to operate and require complicated additional hardware in the device to be tracked. Further, the sensor-based location tracking systems fail to provide a user-friendly and quick mechanism to access the location information of another device and constantly track the location of another device. For example, a tracking system implemented using a global positioning system (GPS) suffers from line-of-site issues in that it cannot penetrate through objects (e.g., buildings) to track tagged objects. As a result, the GPS is ill-suited for many applications, such as those requiring tracking of objects below ground. As another example, a tracking system implemented using Bluetooth suffers from drawbacks. For example, Bluetooth is very limited in the number of end nodes that can be attached to a host. It is not uncommon for a Bluetooth network to be limited to about one to about seven devices. As a result, Bluetooth is ill-suited for many applications, such as those requiring increased scalability of the network size.

Conventionally, the tracking systems generate a plurality of signals that can be detected by a tracker unit to indicate the presence of the devices to be tracked. Frequently, users of related art tracking systems have the difficulty of having to use a specially designed device to perform specific tracking functions, which is inconvenient to the users.

SUMMARY

According to an aspect of an exemplary embodiment, there is provided a method of tracking location of an electronic device, the method including: broadcasting a communication signal in a first short range wireless communication mode; and receiving location information of a second electronic device in a second short range wireless communication mode switched to, from the first short range wireless communication mode, the location information of the second electronic device being detected by using the broadcasted communication signal.

According to an aspect of another exemplary embodiment, there is provided a method of providing information of a first electronic device, the method including: establishing, via a first short range wireless communication, connection between the first electronic device and a second electronic device; detecting, by the first electronic device, a strength of a communication signal broadcasted by a third electronic device via a second short range wireless communication; and determining whether to transmit location information of the first electronic device to the second electronic device based on the detected strength of the communication signal.

According to an aspect of another exemplary embodiment, there is provided an electronic device including: a communication module; and a controller connected with the communication module and configured to: broadcast a communication signal in a first short range wireless communication mode, and receive location information of a second electronic device in a second short range wireless communication mode switched from the first short range wireless communication mode, the location information of the second electronic device being detected by using the broadcasted communication signal.

According to an aspect of another exemplary embodiment, there is provided an electronic device including: a communication module; and a controller connected with the communication module and configured to: establish, via a first short range wireless communication, connection with a second electronic device, detect a strength of a communication signal broadcasted by a third electronic device in a second short range wireless communication, and determine whether to transmit location information of the electronic device to the second electronic device based on the detected strength of the communication signal.

BRIEF DESCRIPTION OF THE DRAWINGS

The above and/or other aspects will become more apparent by describing certain exemplary embodiments with reference to the accompanying drawings in which:

FIG. 3 is a sequence diagram illustrating various operations performed among a first device, a second device and a the third device to track location, according to an exemplary embodiment;

FIG. 5 is a flowchart illustrating a method for tracking location in a hospital environment, according to an exemplary embodiment;

FIG. 7A is a schematic representation of a process of tracking location of a second device when the second device is in proximity of the first device, according to an exemplary embodiment;

DETAILED DESCRIPTION OF THE INVENTION

Figure 1A:
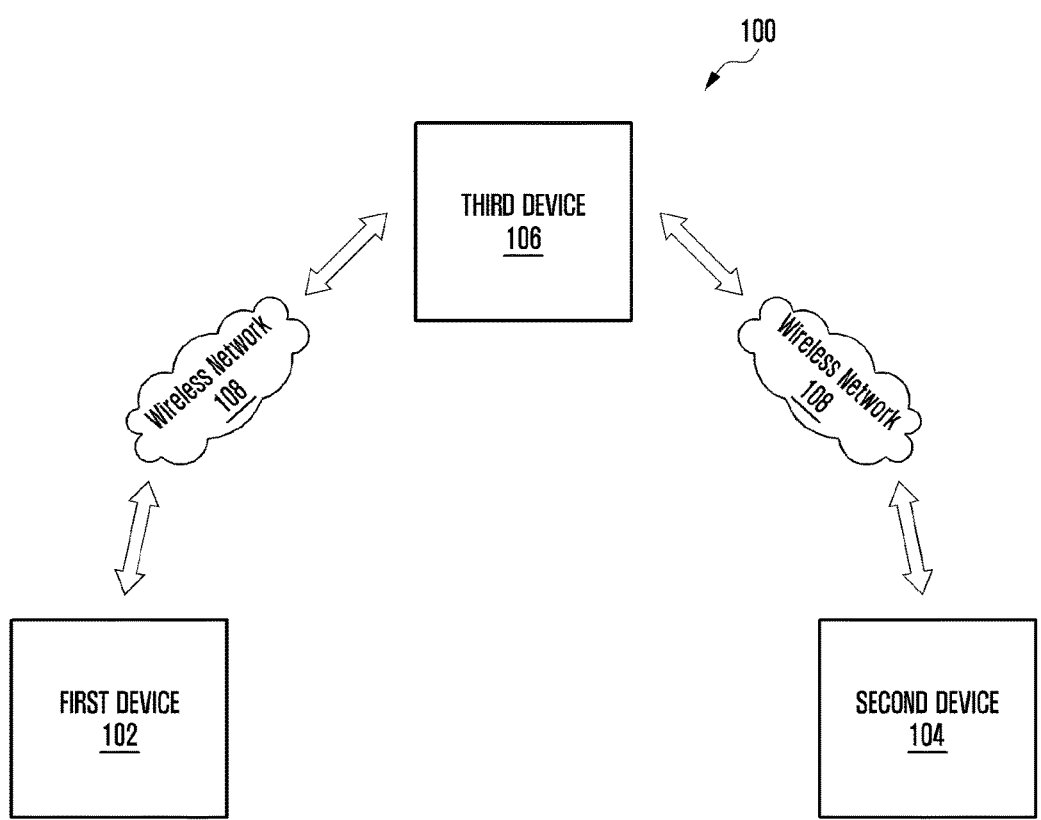
FIG. 1A illustrates a block diagram of a location tracking system, according to an exemplary embodiment.

Certain exemplary embodiments are described in greater detail below with reference to the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the drawings, to explain aspects of the present description. Sizes of elements in the drawings may be exaggerated for convenience of explanation. In other words, since sizes and thicknesses of components in the drawings are arbitrarily illustrated for convenience of explanation, the following exemplary embodiments are not limited thereto.

Descriptions of well-known components and processing techniques are omitted so as to not unnecessarily obscure the exemplary embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate understanding of ways in which the exemplary embodiments herein can be practiced and to further enable those skilled in the art to practice the exemplary embodiments herein. Accordingly, the examples should not be construed as limiting the scope of the exemplary embodiments herein.

One or more exemplary embodiments provide a method and a system for tracking a location. The exemplary embodiments herein provide a location tracking mechanism of a person within a particular region using electronic devices, e.g., smart phones. According to an exemplary embodiment, the method includes broadcasting, by a first device, a hotspot signal, wherein the hotspot signal indicates proximity of the first device to a second device; and receiving, by the first device, a location information of the second device from a third device using a first wireless mode, wherein the first device dynamically switches from a hotspot mode to the first wireless mode, to request the location information of the second device to the third device.

Exemplary embodiments provide an auto nurse detection method of providing location information of a nurse when nurse enters or exits a patient room. Unlike conventional systems, the exemplary embodiments provide a method where the first device switches from a Wi-Fi mode, in which the current status of the second device, e.g., a nurse device is detected, to a mobile hotspot mode, in which the second device that scans the hotspot signal strength can detect whether the second device is near the first device based on the hotspot signal strength.

According to exemplary embodiments, unlike conventional systems, the location and total time spent by a person in any room (or place) in a particular region can be accurately tracked. The exemplary embodiments herein allow any device to detect any other device's presence based on Wi-Fi signal strength of the other device. For example, patients can detect the presence of nurses based on the Wi-Fi signal strength of a patient device. Further, the exemplary embodiments herein allow any device to trigger a specific action when the device detects another device's presence on the basis of a new Wi-Fi detected near the device. The specific actions may include, but not limited to, notifying a server about the presence of the other device or triggering an alarm to notify a plurality of other devices about the other device's presence near the device. Furthermore, the exemplary embodiments herein allow any device to ping the server and request for location information by switching from the hotspot mode to the Wi-Fi mode and ping the server on a local area network (LAN). For example, the patient device can ping the server to check whether the patient is being served by the nurse. The ping (or packet internet groper) can be used to check whether to transmit Internet Protocol (IP) datagram to an application program using a protocol.

Referring now to the drawings, and more particularly to FIGS. 1 through 12, where similar reference characters denote corresponding features consistently throughout the figures exemplary embodiments are described below.

FIG. 1A illustrates a block diagram of a location tracking system 100, according to an exemplary embodiment. As shown in FIG. 1, the location tracking system 100 comprises a first device 102, a second device 104, and a third device 106. The first device 102 and the second device 104 are connected to the third device 106 via a wireless network 108. The first device 102 and the second device 104 described herein can be, for example, a smart phone, tablet computer, phablet or the like. The first device 102 includes a hotspot capability. Further, the first device 102 and the second device 104 support Wi-Fi connectivity. The third device 106 may be a centralized server, computers, or the like. The third device 106 acts as a mediator for processing and handling communications with each of the first device 102 and the second device 104. The third device 106 receives periodic updates from the second device 104 indicating current location of the second device 104. The third device 106 further updates the received location information of the second device 104 in a database. Further, the third device 106 transmits the received location information of the second device 104 to the first device 102 using a first wireless mode when the first device 102 requests the location information of the second device 104 to the third device 106. In an exemplary embodiment, the second device 104 may act as the third device106 by directly broadcasting the location information of the second device 104 with a plurality of second devices 104 in the location tracking system 100.

Unlike the conventional systems, the first device 102 dynamically switches from the Wi-Fi mode to the hotspot mode and vice versa for a predetermined time interval to track the location of the second device 104. Also, the exemplary embodiments herein allow the first device 102 to periodically check for current status of the second device 104 by using the third device 106 and periodically receive the update on the current status of the second device 104 from the third device 106. Further, the exemplary embodiments herein allow the second device 104 to detect the presence of the first device 102 based on the signal strength of the first device's hotspot.

According to an exemplary embodiment, the first device 102, for example but not limited to, a tablet or a smart phone, is fixed at each location which is to be monitored. Further, each person whose location is to be tracked is required to carry the second device 104 along with the person. The third device 106, for example but not limited to, a centralized server, is used for cloud messaging and tracking data. In an exemplary embodiment, the first device 102 at every location (or target location), the person who carries the second device 104 which needs to be tracked and the third device 106 are to be connected to a same network. For example, in a hospital, the first device 102 corresponding to a patient device placed at every patient's room, the second device 104 corresponding to a nurse device that is carried by each nurse, and the third device 106 corresponding to the centralized server are connected to a same network, for example but not limited to, an internet, an intranet or a local area network (LAN). The centralized server is connected to the other devices in the tracking system using a wired or a wireless connection. The other devices in the location tracking system may be connected to the network using a wireless connection. Further, the first device 102 placed at each location that is to be tracked has tethering capability. That is, the first device 102 placed at each location supports a Wi-Fi hotspot feature.

Figure 1B:
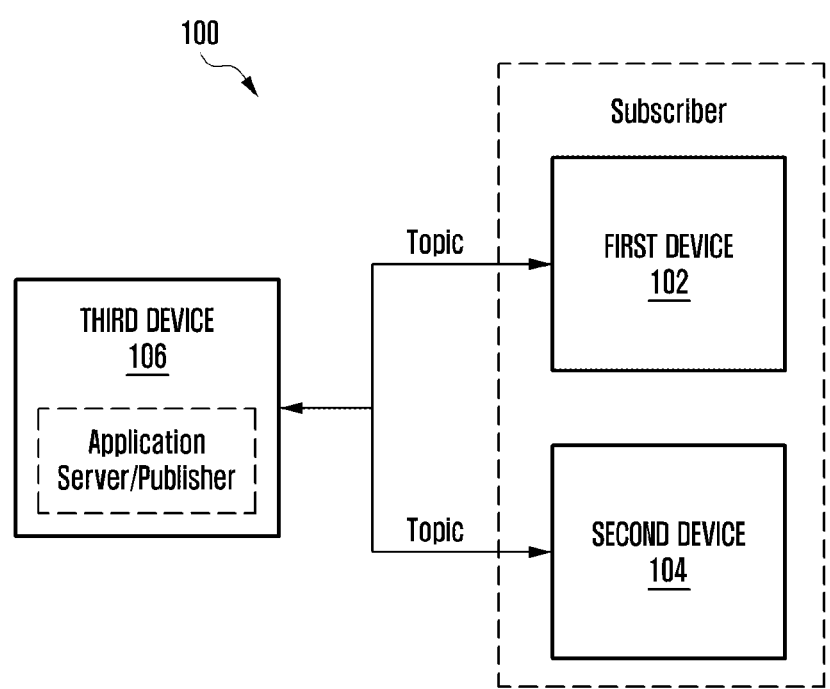
FIG. 1B illustrates an example implementation of a location tracking system 100, according to an exemplary embodiment.

FIG. 1B illustrates an example implementation of a location tracking system 100, according to an exemplary embodiment. In an exemplary embodiment, the system 100 can implement publisher-subscriber Pattern or model in which subscribers typically receive only a subset of the total messages published by a publisher. The process of selecting messages for reception and processing can be performed based on a topic. In such implementation, the third device 103 can be an application server acting as a publisher for all the messages received from the subscribers through a Hyper Text Transfer Protocol (HTTP) request. The second device 102 (such as a patient device) or the second device 104 (such as a nurse device, head nurse device, or the like) may act as subscribers of the system. The messages to the subscriber from the publisher are shared based on a particular topic.

In an exemplary embodiment, the messages are published to "topics" or named logical channels. The subscribers in a topic-based system can receive all messages published to the topics to which the subscribers subscribe, and all subscribers to a topic can receive the same messages. The publisher is responsible for defining the classes of messages to which subscribers can subscribe. For example, each nurse is associated with a particular topic and is subscribed with the publisher to receive messages corresponding to the topic. After receiving the message, the application server can publish the messages corresponding to a particular topic to a message broker. The message broker described herein can be configured to include information about all the subscribers subscribed to a particular topic. The message broker can find the subscribers subscribed to the particular topic and send the message corresponding to the particular topic to all of the subscribers.

After receiving a message from a client, the application server publishes the message corresponding to a particular topic (to which the message will finally be sent) to the broker.

FIGS. 1A and 1B illustrate an example implementation of the system 100 and it is to be understood that other embodiments are not limited thereto. The system 100 can include components interacting locally or remotely along with other hardware or software components to track, by the first device, the location information of the second device using the third device. For example, the component can be, but is not limited to, a process running in the controller or processor, an object, an executable process, a thread of execution, a program, or a computer.

Figure 2A:
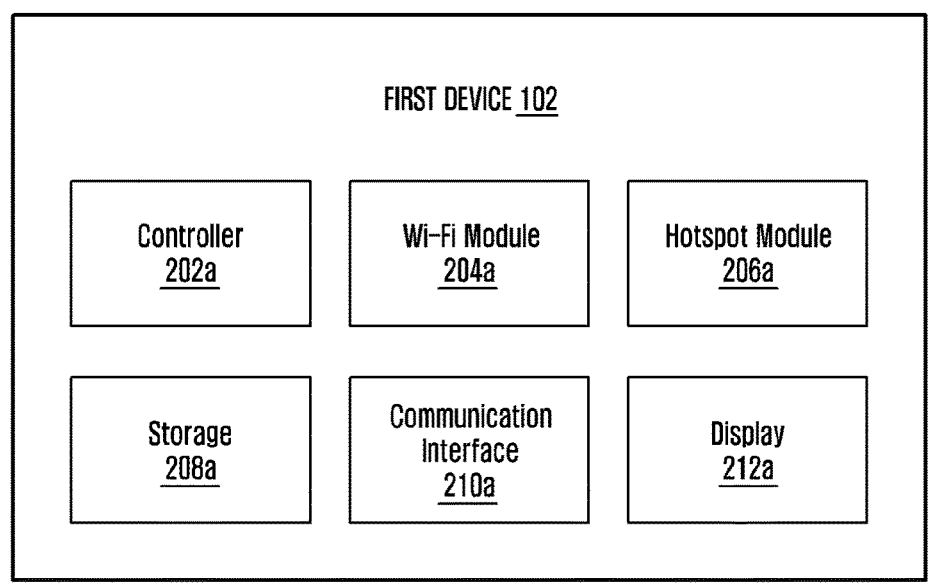
FIG. 2A illustrates a block diagram of a first device as shown in FIG. 1, according to an exemplary embodiments.

FIG. 2A illustrates a block diagram of a first device 102, according to an exemplary embodiment. As shown in FIG. 2, the first device 102 comprises a controller 202a, a Wi-Fi module 204a, a hotspot module 206a, a storage 208a, a communication interface 210a, and a display 212a.

In an exemplary embodiment, the term "device" and "apparatus" are used interchangeably.

The controller 202a is configured for broadcasting the hotspot signal, where the hotspot signal indicates proximity of the first device 102 to the second device 104. Further, the controller 202a is configured for receiving the location information of the second device 104 from the third device 106 using the first wireless mode, where the first device 102 dynamically switches from the hotspot mode to the first wireless mode to request the location information of the second device 104 to the third device 106. The location information indicates one of, for example, in-proximity (or proximity state), out-of-proximity (or non-proximity state), a busy state, and an available state. Further, the controller 202a is configured for switching from the hotspot mode to the first wireless mode after a time interval. The time interval may be predefined by a user or the location tracking system 100. Furthermore, the controller 202a is configured for sending the hotspot signal to the second device 104 after switching from the first wireless mode to the hotspot mode after a time interval. The time interval may be predefined by a user or the location tracking system 100. The controller 202a is further configured for sending a request to acquire the location of the second device 104 to the third device 106 using the first wireless mode, where the third device 106 periodically receives the location information of the second device 104 from the second device 104 using the second wireless mode. Furthermore, the controller 202a is configured for receiving the location information of the second device 104 from the third device 106 using the first wireless mode. For example, the controller 202a may be implemented as a processor such as a central processor unit (CPU), a micro controller unit (MCU), or a micro processor unit (MPU).

The Wi-Fi module 204a is configured for receiving and transmitting a wireless signal to the controller 202a. The Wi-Fi module 204a may include a variety of components used for Wi-Fi wireless communication. For example, the Wi-Fi module 204a may include an antenna, a radio frequency (RF) transmitter for performing a conversion and amplification of the frequency of transmitted signals, an RF receiver which amplifies received signals with low noise and performs a conversion of the frequency of the signals, a modulator/demodulator for the RF signals, a signal processor, and so on.

In accordance with an exemplary embodiment, the Wi-Fi module 204a may perform communication with the network by connecting to an access point or, alternatively, with other external device(s) which can perform Wi-Fi P2P communication according to the WFA Wi-Fi communication standard.

The hotspot module 206a is configured for enabling the first device 102 to behave as a Wi-Fi source for other devices in the network. Further, the hotspot module 206a may be configured to recognize a plurality of events and subsequently, instruct the controller 202a to execute policies in response to recognizing any events. In an exemplary embodiment, the hotspot module 206a may be used to allow the Wi-Fi hotspot to determine and set permission levels for all devices, including administrative devices and target devices. Further, the hotspot module 206a may be configured to perform portable wireless local area network (WLAN) hotspot parameter configuration.

The storage 208a may include one or more computer-readable storage media. The storage device 208a may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storage device 208a may, in some examples, be considered as a non-transitory storage medium. The term "non-transitory" may indicate that the storage medium is not embodied in a carrier wave or a propagated signal. However, the term "non-transitory" should not be interpreted to mean that the storage device 208a is non-movable. In some examples, the storage device may 208a be configured to store larger amounts of information than the memory. In certain examples, a non-transitory storage medium may store data that can, over time, change (e.g., random access memory (RAM) or cache).

The communication interface 210a is configured for communicating with external devices via one or more networks, such as one or more wireless networks.

The display 212a is configured for displaying a set of dialog boxes on a display screen of the first device 102 based on the status of the session established between the first device 102 and the third device 106. For example, the display 212a is configured for displaying the dialog box indicating "message received by a nurse" when a nurse device (acting as the second device 104) has accepted the incoming wireless call from a centralized server (acting as the third device 106).

FIG. 2A illustrates only an example configuration of the first device 102 and it is to be understood that the exemplary embodiments are not limited thereto. The labels provided to each module or component is only for illustrative purpose and does not limit the scope of the invention. Further, the one or more modules can be combined or separated to perform the similar or substantially similar functionalities without departing from the scope of the invention. Furthermore, the various modules can interact locally or remotely along with other hardware or software components to track, by the first device 102, the location information of the second device 104 using the third device 106.

Figure 2B:
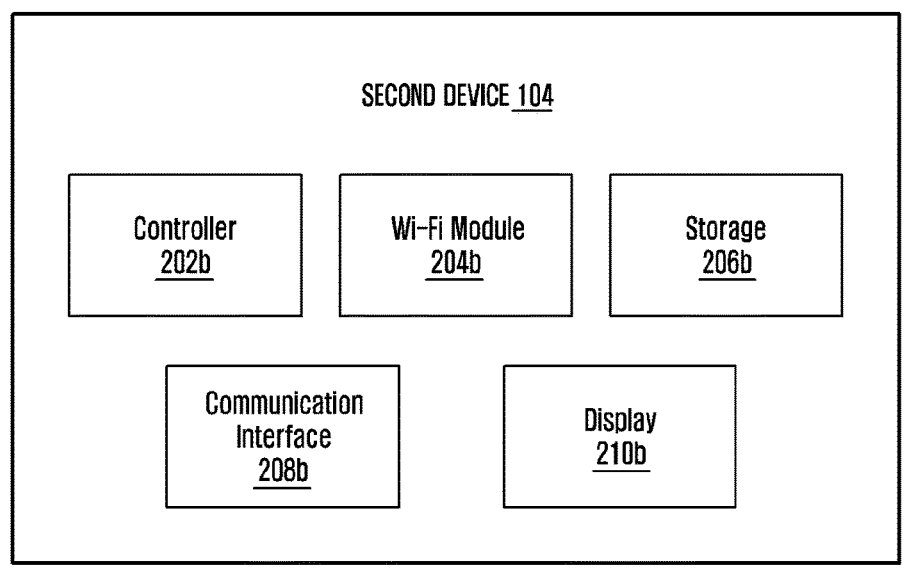
FIG. 2B illustrates a block diagram of a second device as shown in FIG. 1, according to an exemplary embodiment.

FIG. 2B illustrates a block diagram of the second device 104, showing various components for implementing an exemplary embodiment. As shown in FIG. 2B, the second device 104 comprises a controller 202b, a Wi-Fi module 204b, a storage 206b, a communication interface 208b, and a display 210b.

The controller 202b is configured for determining whether signal strength of the hotspot received from the first device 102 is greater than a predefined threshold value, where the signal strength indicates the proximity of the first device 102 with respect to the second device 104. Further, the controller 202b is configured for notifying the third device 106 when the signal strength of the hotspot associated with the first device 102 is greater than the predefined threshold value. In an exemplary embodiment, the controller 202b is configured for notifying an emergency to the third device 106 based on the priority of the first device 102 when the second device 104 identifies the emergency for the first device 102. Furthermore, the controller 202b is configured for broadcasting the emergency to the plurality of second devices 104 using the second wireless mode. For example, the controller 202b may be implemented as a processor such as a central processor unit (CPU), a micro controller unit (MCU), or a micro processor unit (MPU).

The Wi-Fi module 204b is configured for receiving and transmitting a wireless signal to the controller 202b. The Wi-Fi module 204b may include a variety of components used for Wi-Fi wireless communication. For example, the Wi-Fi module 204b may include an antenna, a radio frequency (RF) transmitter for performing conversion and amplification of the frequency of transmitted signals, an RF receiver which amplifies received signals with low noise and performs conversion of the frequency of the signals, a modulator/demodulator for the RF signals, a signal processor, and so on.

In accordance with an exemplary embodiment, the Wi-Fi module 204b may perform communication with the network by connecting to an access point or, alternatively, with other external device(s) which can perform Wi-Fi P2P communication according to the WFA Wi-Fi communication standard.

The storage 206b may include one or more computer-readable storage media. The storage device 206b may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storage device 206b may, in some examples, be considered as a non-transitory storage medium. The term "non-transitory" may indicate that the storage medium is not embodied in a carrier wave or a propagated signal. However, the term "non-transitory" should not be interpreted to mean that the storage device 206b is non-movable. In some examples, the storage device may 206b be configured to store larger amounts of information than the memory. In certain examples, a non-transitory storage medium may store data that can, over time, change (e.g., in random access memory (RAM) or cache).

The communication interface 208b is configured for communicating with external devices via one or more networks, such as one or more wireless networks.

The display 210b is configured for displaying a set of dialog boxes on a display screen of the second device 104 based on the status of the session established between the second device 104 and the third device 106. For example, the display 210b is configured for displaying the dialog box indicating "currently attending a patient" when a nurse device (acting as the second device 104) has accepted the incoming wireless call from a centralized server (acting as the third device 106. The display 210b may also display a plurality of dialog boxes such as, but not limited to call count, calling, accepted, forwarding and attending.

FIG. 2B illustrates only an example configuration of the second device 104 and it is to be understood that other embodiments are not limited thereto. The labels provided to each module or component is only for illustrative purpose and does not limit the scope of the invention. Further, the one or more modules can be combined or separated to perform the similar or substantially similar functionalities without departing from the scope of the invention. Furthermore, the various modules can interact locally or remotely along with other hardware or software components to update, by the second device 104, the location information of the second device 104 using the third device 106.

Figure 2C:
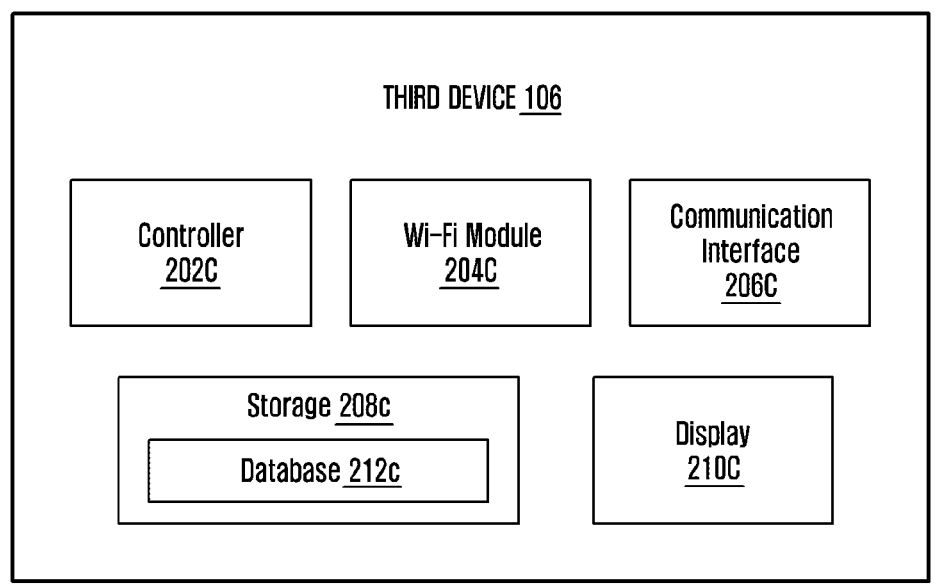
FIG. 2C illustrates a block diagram of a third device as shown in FIG. 1, according to an exemplary embodiment.

FIG. 2C illustrates a block diagram of the third device 106, such as those shown in FIG. 1, showing various components for implementing an exemplary embodiment. As shown in FIG. 2C, the third device 106 comprises a controller 202c, a Wi-Fi module 204c, a storage 206c, a communication interface 208c, and a display 210c. The storage 206c further comprises a database 212c configured for storing location information of the plurality of second devices 104. The controller 202c is configured for establishing a connection with each of the first device 102 and the second device 104 using the first wireless mode and the second wireless mode. Also, the controller 202c is configured for receiving a periodic request from the first device 102 requesting a current status of the second device 104. Further, the controller 202c is configured for receiving location information of the second device 104 from the second device 104. Further, the controller 202c is configured for updating the received location information of the second device 104 in the database 212c when the second device 104 is in proximity with the first device 102. Further, the controller 202c is configured for sending the location information to the first device 102 using the first wireless mode in response to receiving a request from said first device 102. In an exemplary embodiment, the controller 202c is further configured for broadcasting emergency requests to the plurality of second devices 104 when the second device 104 identifies an emergency. For example, the controller 202c may be implemented as a processor such as a central processor unit (CPU), a micro controller unit (MCU), or a micro processor unit (MPU).

The Wi-Fi module 204c is configured for receiving and transmitting a wireless signal to the controller 202c. The Wi-Fi module 204c may include a variety of components used for Wi-Fi wireless communication. For example, the Wi-Fi module 204c may include an antenna, a radio frequency (RF) transmitter for performing conversion and amplification of the frequency of transmitted signals, an RF receiver which amplifies received signals with low noise and performs conversion of the frequency of the signals, a modulator/demodulator for the RF signals, a signal processor, and so on.

In accordance with an exemplary embodiment, the Wi-Fi module 204c may perform communication with the network by connecting to an access point or, alternatively, with other external device(s) which can perform Wi-Fi P2P communication according to the WFA Wi-Fi communication standard.

The storage 206c may include one or more computer-readable storage media. The storage device 206c may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storage device 206c may, in some examples, be considered a non-transitory storage medium. The term "non-transitory" may indicate that the storage medium is not embodied in a carrier wave or a propagated signal. However, the term "non-transitory" should not be interpreted to mean that the storage device 206c is non-movable. In some examples, the storage device may 206c be configured to store larger amounts of information than the memory. In certain examples, a non-transitory storage medium may store data that can, over time, change (e.g., in random access memory (RAM) or cache).

The communication interface 208c is configured for communicating with external devices via one or more networks, such as one or more wireless networks.

The display 210c is configured for displaying a set of dialog boxes on a display screen of the third device 106 based on the status of the session established between the first device 102 and the third device 106 and the second device 104 and the third device 106. For example, the display 210c is configured for displaying the dialog box indicating "allotted nurse", "nurse availability" and other status known in the art when a nurse device (acting as the second device 104) has accepted the incoming wireless call from the centralized server (acting as the third device 106). The current status of the nurse device may include one or more of bed allocation to patient (whether bed free/allocated), current nurse call status of beds, image of nurse who is supposed to attend the call, number of calls served for that bed and so on.

FIG. 2C illustrates only an example configuration of the third device 106 and it is to be understood that other embodiments are not limited thereto. The labels provided to each module or component is only for illustrative purpose and does not limit the scope of the invention. Further, the one or more modules can be combined or separated to perform the similar or substantially similar functionalities without departing from the scope of the invention. Furthermore, the various modules can interact locally or remotely along with other hardware or software components to track, by the third device 106, the location information of the second device 104.

Figure 2D:
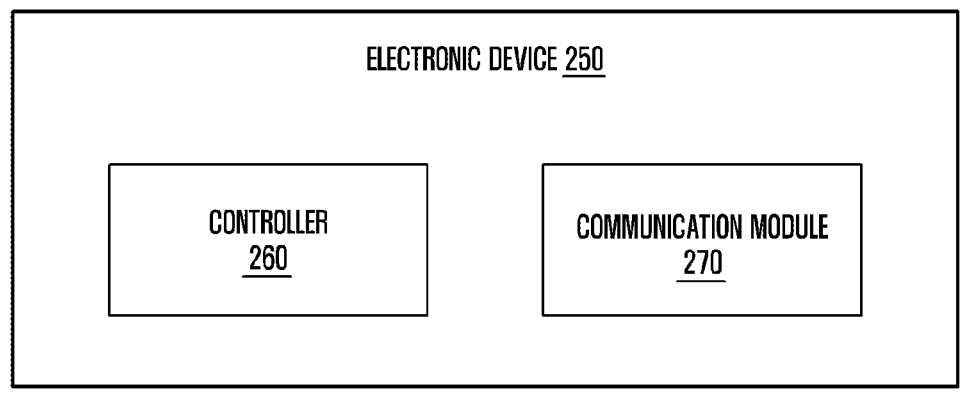
FIG. 2D illustrates a block diagram of an electronic device as shown in FIG. 1, according to an exemplary embodiment.

FIG. 2D illustrates a block diagram of an electronic device, such as those shown in FIG. 1, showing various components for implementing an exemplary embodiment.

According to an exemplary embodiment, an electronic device 250 can be either a first device 102 or a second device 104. According to an exemplary embodiment, an electronic device 250 can include a controller 260 and a communication module 270. According to an exemplary embodiment, components of the electronic device 250 can be added or omitted.

According to an exemplary embodiment, the communication module 270 can broadcast a communication signal in a first short range wireless communication mode. For example, the communication module 270 can include module supporting a hotspot function and the first short range wireless communication mode can be a hotspot mode.

According to an exemplary embodiment, the communication module 270 can switch a Wi-Fi mode to a hotspot mode, and then can broadcast hotspot communication signal in the hotspot mode.

According to an exemplary embodiment, the controller 260 can switch a first short range wireless communication mode to a second short range wireless communication mode.

According to an exemplary embodiment, the controller 260 can maintain a hotspot mode during a predetermined time and then switch the hotspot mode to Wi-Fi mode.

According to an exemplary embodiment, the controller 260 can receive location information of a second electronic device by using wireless communication of the second short range wireless communication mode. According to an exemplary embodiment, the controller 260 transmits a signal for requesting location information of a second electronic device to a third electronic device, such as a host device or server. According to an exemplary embodiment, the controller 260 can receive location information of the second electronic device by using wireless communication of Wi-Fi mode. For example, the controller 260 may be implemented as a processor such as a central processor unit (CPU), a micro controller unit (MCU), or a micro processor unit (MPU).

For example, the location information can include information related to one of in-proximity, out-of-proximity, busy, and available state.

According to an exemplary embodiment, the controller 260 can establish connection with another electronic device, such as a host device or server, via a first short range wireless communication. The first short range wireless communication can be Wi-Fi communication.

According to an exemplary embodiment, the controller 260 can identify strength of a second short range wireless communication signal broadcasted by a second electronic device. The second short range wireless communication signal can be hotspot signal. According to an exemplary embodiment, the controller 260 can determine whether to transmit relation information to the other electronic device based on the identified second electronic device.

According to an exemplary embodiment, the controller 260 can determine whether to transmit relation information to the other device based on the identified strength of the second short range communication signal.

According to an exemplary embodiment, the controller 260 can transmit information including in-proximity information of the second electronic device to the other device if the strength of wireless communication signal exceeds a predetermined threshold.

According to an exemplary embodiment, the controller 260 can controller receives input signal for emergency situation. The controller 260 can transmit information related to the emergency situation to the other device in response to receiving the input signal. The controller 260 can transmit information related to the emergency situation to other devices by using Wi-Fi mode.

FIG. 3 is a sequence diagram illustrating various operations 300 performed among the first device 102, the second device 104, and the third device 106 to track location, according to an exemplary embodiment. At step 302, the first device 102 can be configured to send a request to acquire the location of the second device 104 using a first wireless mode to the third device 106. In an exemplary embodiment, the first wireless mode can be a Wi-Fi mode. At step 304, the third device 106 can be configured to identify the request and to initiate an incoming wireless call with the second device 104 indicating the request received from the first device 102.

At step 306, the third device 106 receives an acknowledgement from the second device 104 indicating that the second device 104 has accepted the incoming wireless call. At step 308, the third device 106 can be configured to send an acknowledgement message to the first device 102 indicating that the second device 104 is now aware of the request upon initiating the incoming wireless call with the second device 104. Subsequently, at step 310, the first device 102 can be configured to dynamically switch from the first wireless mode to the hotspot mode. During this process, the firs device calculates the time interval to stay in the hotspot mode for a sufficient duration so that the second device 104 may obtain enough samples of signal strength. In an exemplary embodiment, the first device 102 can be configured to remain in the hotspot mode for a predetermined time interval. The time interval may be predefined by a user or the location tracking system 100.

At step 312, the first device 102 can be configured to constantly broadcast the hotspot signal to the plurality of secondary devices 104 in the location tracking system during the hotspot mode. At step 314, the first device 102 can be configured to switch back to the Wi-Fi mode to connect with the third device 106 upon expiry of the predetermined time interval. The time interval may be predefined by a user or the location tracking system 100. Before switching to the Wi-Fi mode, the first device 104 calculates the time required to switch to Wi-Fi mode. The sample collection time by the second device 104 needs to be greater than the duration of the Wi-Fi mode.

At step 316, the first device 102, in the Wi-Fi mode, can be configured to send an enquiry to the third device 106 asking if the location information of the second device 104 is received. At step 318, the third device 106 can be configured to send the location information of the second device 104 as indicating "out of proximity" to the first device 102. The third device 106 can be configured to send the location information of the second device 104 to the first device 102 upon receiving the enquiry from the first device 102. The location information can include the status of the second device 104 such as, but not limited to, in-proximity, out of proximity, busy, and available. The third device 106 can be configured to send the location information containing status of the second device 104 as out of proximity to the first device 102 until the third device 106 receives an update for the location of the second device 104 from the second device 104.

In an exemplary embodiment, if the second device 104 provides the update to the third device 106 indicating that the second device 104 is currently busy, then the third device 106 can be configured to update the database 212c accordingly and to send the location information of the second device 104 as indicating "busy" status of the second device 104 to the first device 102. In another exemplary embodiment, if the second device 104 sends the update to the third device 106 as its status indicating available, then the third device 106 can be configured to send the location information of the second device 104 as indicating "available" but not in proximity to the first device 102.

At step 320, the second device 104 can be configured to detect the hotspot signal broadcasted by the first device 102 based on the signal strength. For example, the second device 104 is constantly in the Wi-Fi mode, detecting available Wi-Fi sources. During this process, when the first device 102 broadcasts the hotspot signal, where the first device 102 is acting as a Wi-Fi source, the second device 104 can be configured to detect this Wi-Fi hotspot signal of the first device 102 and to start measuring the signal strength of this hotspot signal. When the second device 104 detects signal strength of the hotspot signal above a threshold being received from the first device 102, then at step 322, the second device 104 can be configured to notify the location information of the second device 104 to the third device 106 indicating that the second device 104 is in-proximity to the first device 102 using the second wireless mode. In an exemplary embodiment, the second wireless mode may include the Wi-Fi mode. The second wireless mode corresponds to the connection between the second device 104 and the third device 106.

At step 324, the third device 106 can be configured to receive the notification from the second device 104 and to update the database 212c with the location information of the second device 104. At step 326, the third device 106 can be configured to send the updated location information of the second device 104 to the first device 102 using the first wireless mode.

The exemplary embodiments herein describe a method of switching, by the first device 102, from the hotspot mode to the Wi-Fi mode and ping the third device 106 (for example, by an HTTP request) for the current status of the second device 104. Further, the first device 102 again switches to the hotspot mode so that second device 104 which scans for the hotspot signal strength can detect the strength and can trigger a particular action accordingly with respect to the range. This switching from the Wi-Fi mode to the hotspot mode occurs after every n seconds (n being a positive number).

Figure 4A:
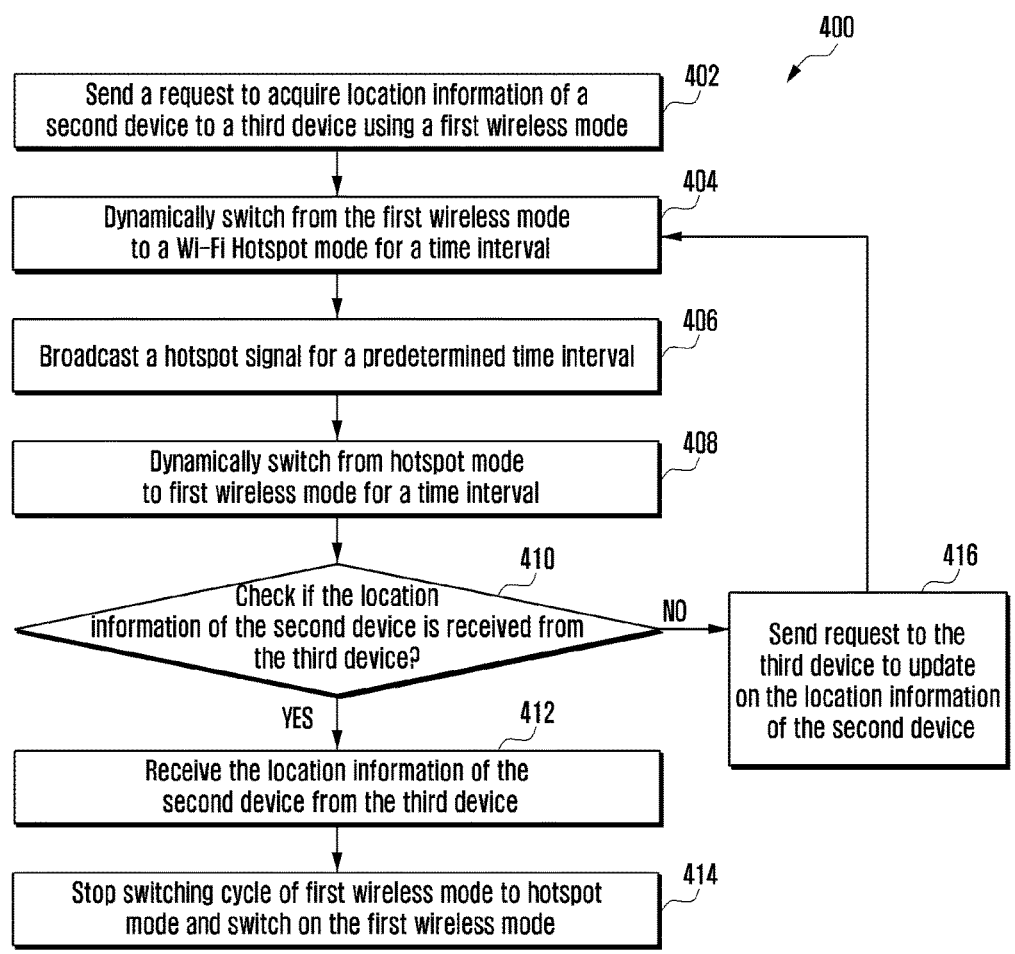
FIGS. 4A-4C are flowcharts illustrating a method for tracking location, according to exemplary embodiments.

FIG. 4A is a flowchart illustrating a method 400 for tracking location, according to an exemplary embodiment. At step 402, the method 400 includes sending a request to acquire location of the second device 104 to the third device 106 using the first wireless mode by the first device 102. At step 404, the method 400 includes dynamically switching from the first wireless mode to the hotspot mode for the predetermined time interval by the first device 102. At step 406, the method 400 includes broadcasting the hotspot signal from the first device 102 for the predetermined time interval during the hotspot mode. After the expiry of the predetermined time interval, the method 400 includes dynamically switching back to the first wireless mode from the hotspot mode by the first device 102 and remaining in the first wireless mode for the time interval. In an exemplary embodiment, the first wireless mode corresponds to the Wi-Fi mode.

At step 410, the method 400 includes checking if the location information of the second device 104 is received from the third device 106 when the first device 102 remains in the Wi-Fi mode. If the location information of the second device 104 is received from the third device 106, then at step 412, the method 400 includes receiving the location information of the second device 104 from the third device 106 using the first wireless mode. At step 414, the method 400 includes terminating the switching cycle from the first wireless mode to the hotspot mode and vice versa at the first device 102 and switching on only the first wireless mode at the first device 102.

On the other hand, if the location information of the second device 104 is not received from the third device 106, then at step 416, the method 400 includes sending a request to update the location information of the second device 104 to the third device 106 by the first device 102 and the process is then transferred back to step 404.

The various actions, acts, blocks, steps, or the like in the method 400 may be performed in the order presented, in a different order or simultaneously. Further, in some exemplary embodiments, some of the actions, acts, blocks, steps, or the like may be omitted, added, modified, skipped, or the like without departing from the scope of the invention. The various steps of the method 400 are summarized into individual block where some of the steps are performed by first device 102 or the third device 106. The method 400 and other description provide a basis of a control program which can be implemented using microcontroller, microprocessor, or equivalent thereof.

Figure 4B:
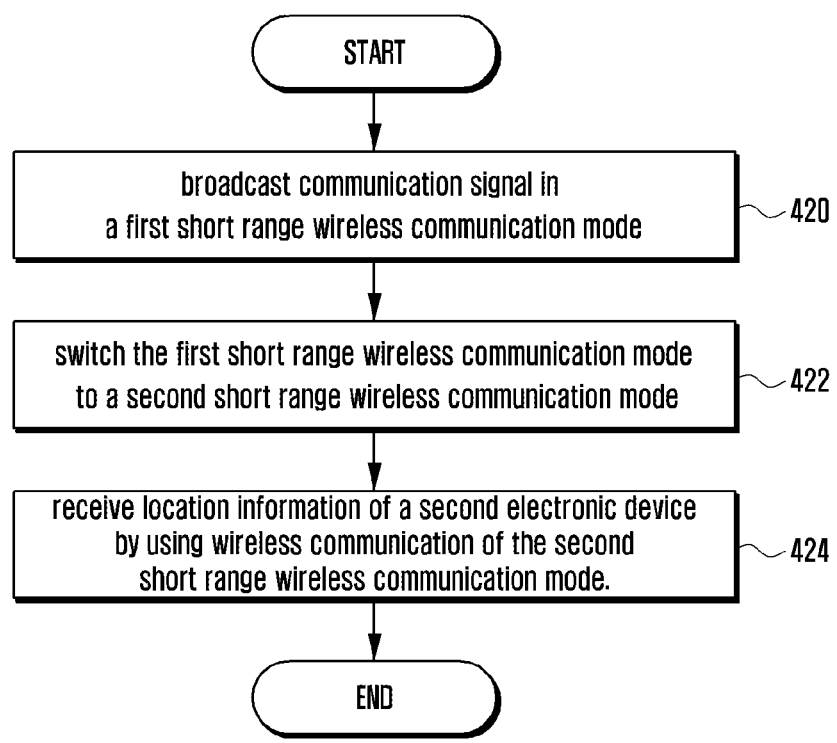

FIG. 4B is a flowchart illustrating a method 400 for tracking location, according to an exemplary embodiment. FIG. 4B can be a flowchart illustrating a method that is performed with respect to the first device 102.

In operation 420, an electronic device broadcast communication signal in a first short range wireless communication mode. According to an exemplary embodiment, an electronic device can switch a Wi-Fi mode to a hotspot mode and then broadcast hotspot communication signal in the hotspot mode.

In operation 422, the electronic device switch the first short range wireless communication mode to a second short range wireless communication mode. According to an exemplary embodiment, the electronic device can maintain the hotspot mode, and then switch the hotspot mode to the Wi-Fi mode.

In operation 424, the electronic device receive location information of a second electronic device by using wireless communication of the second short range wireless communication mode. According to an exemplary embodiment, the electronic device can transmit a signal for requesting location information of the second electronic device to a third electronic device, such as a host device or server. According to an exemplary embodiment, the electronic device can receive location information of the second electronic device via Wi-Fi wireless communication of the Wi-Fi mode.

Figure 4C:
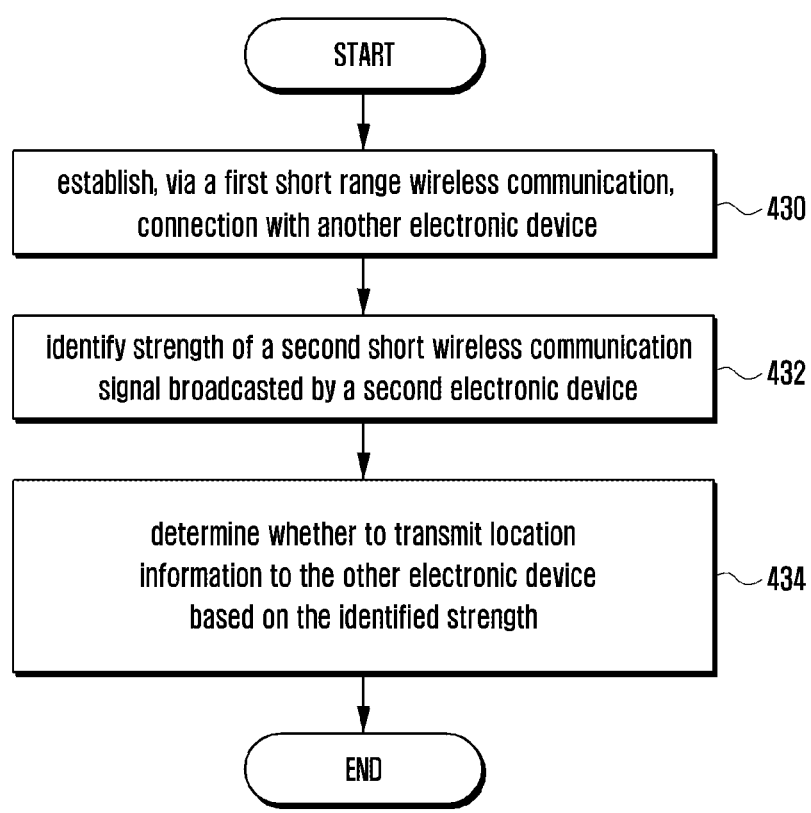

FIG. 4C is a flowchart illustrating a method 400 for tracking location, according to an exemplary embodiment. FIG. 4C can be a flowchart illustrating a method performed with respect to the second device 104.

In operation 430, an electronic device (e.g., the second device 104) establishes connection with another electronic device (e.g., the third device 106) via a first short range wireless communication. The first short range wireless communication can be Wi-Fi communication.

In operation 432, an electronic device identifies strength of a second short range wireless communication signal broadcasted by a second electronic device (e.g., the first device 102). The strength of a second short range wireless communication signal can be strength of a hotspot signal. According to an exemplary embodiment, the electronic device can determine whether to transmit location information (or relative location information) to the other electronic device based on the identified strength of the second short range wireless communication signal.

In operation 434, an electronic device determines whether to transmit location information to the other electronic device based on the identified second short range wireless communication signal. According to an exemplary embodiment, the electronic device can transmit information including in-proximity information of the second electronic device to the other device, such as host device or server, if the strength of wireless communication signal exceeds a predetermined threshold.

According to an exemplary embodiment, the electronic device can receive an input signal for emergency situation. According to an exemplary embodiment, the electronic device can transmit information related to the emergency situation to the other device in response to receiving the input signal. According to an exemplary embodiment, the electronic device can transmit information related to the emergency situation to other devices by using the Wi-Fi mode.

FIG. 5 is a flowchart illustrating a method 500 for tracking location in a hospital environment, according to an exemplary embodiment. In an exemplary embodiment, consider the location tracking system 100 is implemented in a hospital. In this scenario, the first device 102 may correspond to the patient device, the second device 104 may correspond to the nurse device and the third device 106 may correspond to the centralized server. In an exemplary embodiment, patient devices may correspond to a tablet and nurse devices may correspond to a smart phone or a tablet or the like. In an exemplary embodiment, the patient devices are placed at each patient room, and the nurse devices are carried by nurses in the hospital. Hence, the patient devices are stationary and the nurse devices move through the hospital. The centralized server may be fixed at one location inside the hospital, such as basement or at any floor. The centralized server may be monitored by an authority of the hospital such as a head nurse or administrative personnel in the hospital. Further, the nurse device, the patient device and the centralized server are connected to a same network such as, for example but not limited to, the internet, the intranet or the LAN. The patient device has a dual mode in the location tracking system 100. The patient device communicates with the centralized server using the wireless connection, for example, the Wi-Fi, when the patient device is in the Wi-Fi mode. Further, the patient device broadcasts the hotspot signal in the location tracking system 100 to a plurality of devices to indicate its presence to other devices in the location tracking system 100. The hotspot signal is broadcasted by the patient device when the patient device is in the hotspot mode. It is to be understood that the patient device has the capability of both Wi-Fi and the tethering.

With these considerations, at step 502, the method 500 includes initiating a wireless call by the patient device for tracking the nurse device to the centralized server. The patient device communicates with the centralized server and then the centralized server forwards the communication to the nurse device. When the patient device seeks attention, the patient device initiates a request through the wireless call with the centralized server using the Wi-Fi connection. Here, the patient device is in the Wi-Fi mode as it is connected to the Wi-Fi connection. When the centralized server receives this request from the patient device, the centralized server forwards the request to the nurse device through the wireless call indicating which patient is seeking attention. At step 504, the method 500 includes identifying the incoming wireless call from the centralized server by the nurse device and accepting the incoming wireless call indicating that the nurse is expected to attend the patient in some time.

At step 506, the method 500 includes switching off the Wi-Fi connection and turning on the hotspot by the patient device. The patient device keeps switching from the Wi-Fi mode to the hotspot mode until the patient is attended by the nurse. Each time the patient device is switched from the Wi-Fi mode to the hotspot mode and vice versa, it remains in a corresponding mode for the predetermined time interval. This time interval is configurable by the user or may be configured by the patient device.

At step 508, after the expiry of the time interval, e.g., m seconds (m being a positive number), the method 500 includes switching off the hotspot mode and turning on the Wi-Fi mode by the patient device. The patient device remains in the Wi-Fi mode for, e.g., n seconds (n being a positive number). During the Wi-Fi mode, at step 510, the centralized server is pinged by the patient device to check whether the nurse has attended the patient. If the centralized server updates the patient device indicating that the nurse has served the patient, then at step 512, the method 500 includes terminating the Wi-Fi to the hotspot switching cycle and switching on only the Wi-Fi by the patient device.

On the other hand, if the centralized server updates the patient device indicating that the nurse has not yet served the patient, then the method 500 includes repeating the steps 506 to 510.

In an exemplary embodiment, when the nurse leaves patient's room temporarily (for fetching medicines, cotton, syringe, or the like.) and if the nurse enters in proximity of same media access control (MAC) identification (ID) in a predefined time limit, then a call from the patient's device is automatically invoked to the nurse. Further, the call is automatically accepted on the nurse device, such as to maintain continuity of attending the patient.

In an exemplary embodiment, the patient can send feedback to the server about ratings of hospital, nurse feedback, or the like.

The various actions, acts, blocks, steps, or the like in the method 500 may be performed in the order presented, in a different order or simultaneously. Further, in some embodiments, some of the actions, acts, blocks, steps, or the like may be omitted, added, modified, skipped, or the like without departing from the scope of the invention. The method 500 and other description provide a basis of a control program which can be implemented using microcontroller, microprocessor, or equivalent thereof.

Although the above exemplary embodiments are described with respect to a hospital scenario, it is to be understood by a person skilled in the art that other embodiments are not limited thereto.

The systems and methods according to the exemplary embodiments can be used to track the location of an electronic device in any other field. For example, a passenger in a train can be tracked by a ticket checker. Here, the first device 102 corresponds to a specific device in each coach of the train, the second device 104 may correspond to a device of each of the passengers and the third device may correspond to a device of the ticket checker. The passengers enter the coach of the train equipped with the Wi-Fi and a device emitting hotspot signals placed in each coach. The mobile device associated with the passengers (acting as the second device 104) starts scanning the signal strength of the hotspot signal corresponding to the MAC address allocated thereto at the time of ticket registration. As soon as the mobile device associated with the passengers detects that the mobile device is within a particular range from the device emitting hotspot signals, the mobile device sends the notification to the ticket examiner that the passenger has come to his or her seat. After receiving the notification, the ticket examiner detects that the passenger has arrived at his or her seat and hence the ticket examiner does not need to visit the passenger to check the passenger's ticket.

In other exemplary embodiments, a student can be tracked for attendance in educational organizations, and a passenger can be tracked in airports by using the systems and methods of the exemplary embodiments.

Figure 6:
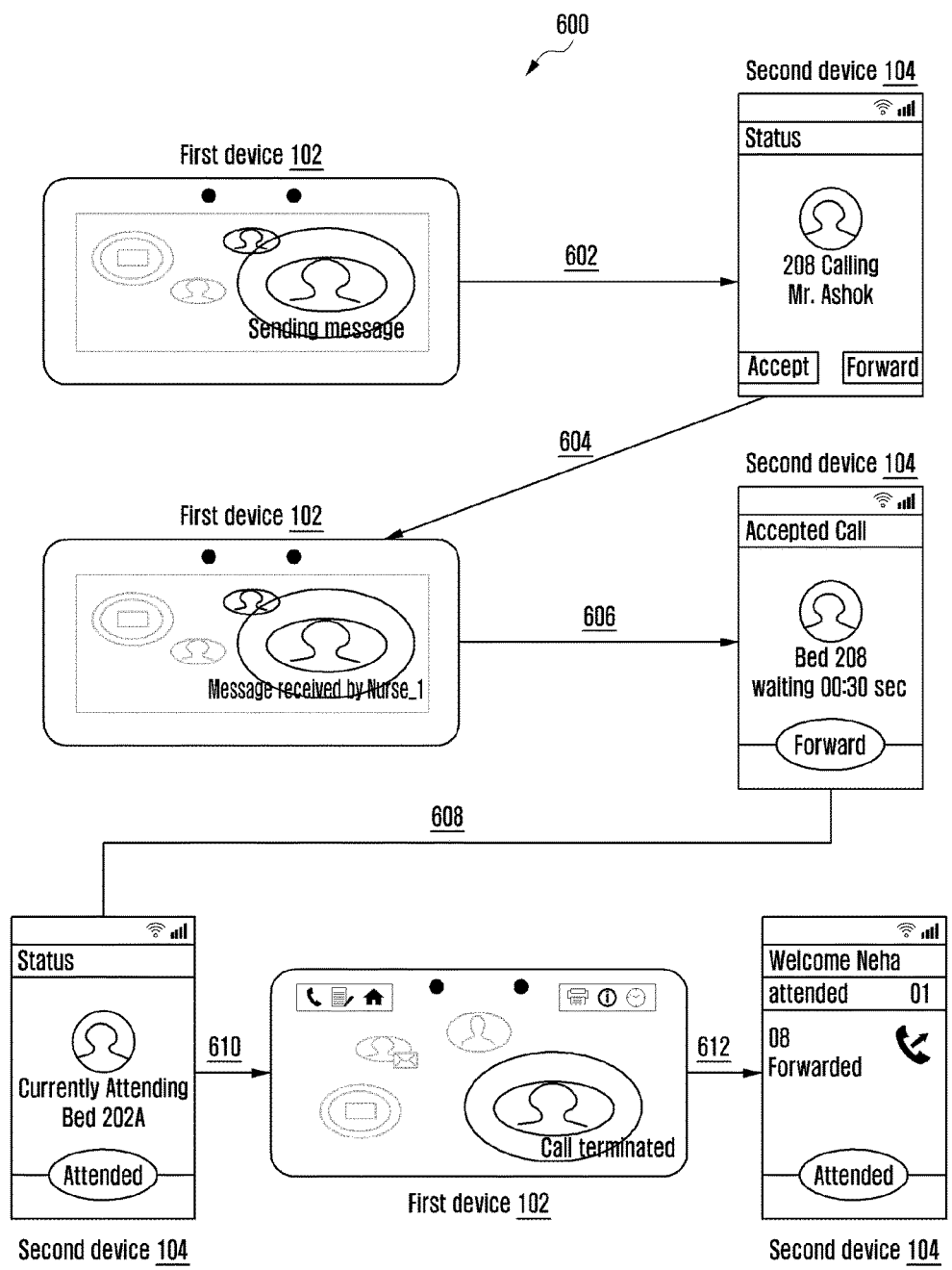
FIG. 6 is a schematic representation of a process of tracking location, according to an exemplary embodiment.

FIG. 6 is a schematic representation of a process 600 of tracking location, according to an exemplary embodiment. In an exemplary embodiment, consider the location tracking system 100 is implemented in the hospital. In this scenario, the first device 102 may correspond to the patient device, the second device 104 may correspond to the nurse device and the third device 106 may correspond to the centralized server. At step 602, the patient device sends the request to the centralized server using the first wireless mode seeking attention from the nurse. The centralized server then initiates the wireless call to the nurse device using the second wireless mode to indicate the nurse device that the patient is seeking her attention. The patient device keeps switching from the Wi-Fi mode to the hotspot mode until the patient device receives an intimation from the centralized server that the nurse has attended the patient. In the Wi-Fi mode, the patient device constantly enquires the centralized server to update on the location information of the nurse device. The centralized server sends, in response to each enquiry, an acknowledgement message indicating that the nurse device is still out of proximity when the centralized server has not received any update from the nurse device. Upon expiry of the time interval, the patient device switches to the hotspot mode in which the patient device broadcasts the hotspot signal to indicate its presence to other devices for the predetermined interval. Upon expiry of this predetermined time interval, the patient device again switches back to the Wi-Fi mode to further enquire the centralized server about the update on the location information of the nurse device. This process is repeated until the centralized server indicates the patient device that the nurse has served the patient.

Further, when the nurse device receives the wireless call, the display screen of the nurse device indicates the incoming wireless call from the patient along with a specific identification (ID) associated with the patient. The display screen of the nurse device provides two options to the nurse when the wireless call is received, namely, accept and forward. Consider that the nurse accepts the incoming call from the centralized server then, at step 604, the centralized server notifies the same to the patient device. The display screen of the patient device now indicates the patient that the message is received by the nurse.

At step 606, the display screen of the nurse device changes from patient calling to patient waiting along with the time. For example, if it has been 30 seconds since when the nurse has accepted the wireless incoming call from the centralized server, then the display screen of the nurse device indicates that the patient has been waiting since 30 seconds.

At step 608, the nurse device keeps monitoring the hotspot signal broadcasted by the patient device and measures the hotspot signal strength. As soon as the nurse device measure the hotspot signal strength to be greater than a predefined threshold (for example, −48), the nurse device considers itself to be near patient's room (for example, within 3 meters). When the nurse device detects that the nurse is in proximity to the patient, then the nurse device sends this status to the centralized server over the Wi-Fi network. Here, the nurse device is not connected to the patient device's hotspot, but only measures the hotspot signal strength. Once, the nurse device indicates the centralized server that the nurse is in proximity to the patient, then the display screen of the nurse device changes to currently attending the patient. Further, the centralized server forwards the location information of the nurse device using the first wireless mode, indicating that the nurse is near the patient device.

At step 610, the notifying dialog on a patient side is closed automatically when the patient device receives the location information of the nurse device indicating that the nurse is near the patient. However, the patient device continues to switch from the Wi-Fi mode to the hotspot mode and vice versa until the patient device receives an update from the centralized server indicating that the nurse has served the patient and left the room.

At step 612, the nurse attends the patient and leaves the room. The nurse device automatically detects a weak signal strength of the hotspot signal when the nurse leaves the patient room after serving. Then, the nurse device notifies the centralized server that it has served the patient using the second wireless mode. The display screen of the nurse device closes the dialog box corresponding to the session with the centralized server for the patient and then displays a screen indicating that the nurse has currently attended one patient. Now, when the patient device enquires the centralized server to provide the location information of the nurse device using the first wireless mode, the centralized server forwards the updated location information of the nurse device currently received from the nurse device to the patient device, indicating the patient that the nurse has served the patient and left the room. Upon receiving this location information of the nurse device, patient device stops the Wi-Fi hotspot cycle and switches on the Wi-Fi.

The exemplary embodiment described herein allow for a "CURRENT" nurse to forward the call, for example, to a warden, in which case, the warden can assign it to free nurse or cater to the call in person. Once the wireless call is forwarded by "CURRENT" nurse to the warden, on call status page of the centralized server, nurse details (such as name or image) is automatically replaced by the warden's details. Also, the wireless call status is updated from "calling" to "forwarding".

The exemplary embodiment described herein allow the "CURRENT" nurse to forward the wireless call to the warden even after accepting the wireless call. In such a case, the wireless call status is updated from "accepted" to "forwarding.

FIG. 7A is a schematic representation of a process 700a of tracking the location of the second device 104 when the second device 104 comes in proximity of the first device 102, according to an exemplary embodiment. In an exemplary embodiment, consider the location tracking system 100 is implemented in the hospital. In this scenario, the first device 102 may correspond to the patient device, the second device 104 may correspond to the nurse device and the third device 106 may correspond to the centralized server. Consider a scenario where the nurse device has accepted the incoming wireless call from the centralized server and the patient device is broadcasting the hotspot signal to the plurality of devices in the location tracking system 100 as the patient device is currently in the hotspot mode.

At step 702a, the nurse device detects the hotspot signal of the patient device by measuring the signal strength of the hotspot signal and determines the proximity of the nurse device with the patient device as described earlier. Since the nurse device is not in close proximity of the patient device, the display screen of the nurse device shows "bed waiting" as the status along with the time. For example, if the nurse device has received a request for a patient from Bed 208, then the display screen of the nurse device indicates "Bed 208 waiting" along with the time from which the patient is waiting as described earlier.

At step 704a, the display screen of the nurse device changes to "currently attending" when the nurse device determines that the nurse device is in proximity with the patient device. For example, when the nurse has entered the patient's room, the display screen of the nurse device changes to "currently attending". Further, the nurse device informs the centralized server indicating that the nurse device is in proximity to the patient device using the second wireless mode.

At step 706a, the centralized server receives the location information of the nurse device indicating that the nurse device is currently in proximity with the patient device and displays the current status of the nurse associated with the nurse device on the display screen. Each time the third device 106 receives a new notification from either the first device 102 or the second device 104, the display screen of the third device 106 displays a pop-up box indicating the new notification. For example, the pop up indicates number of updates received from the first device 102 or the second device 104, and the status of wireless call associated with each second device 104.

Figure 7B:
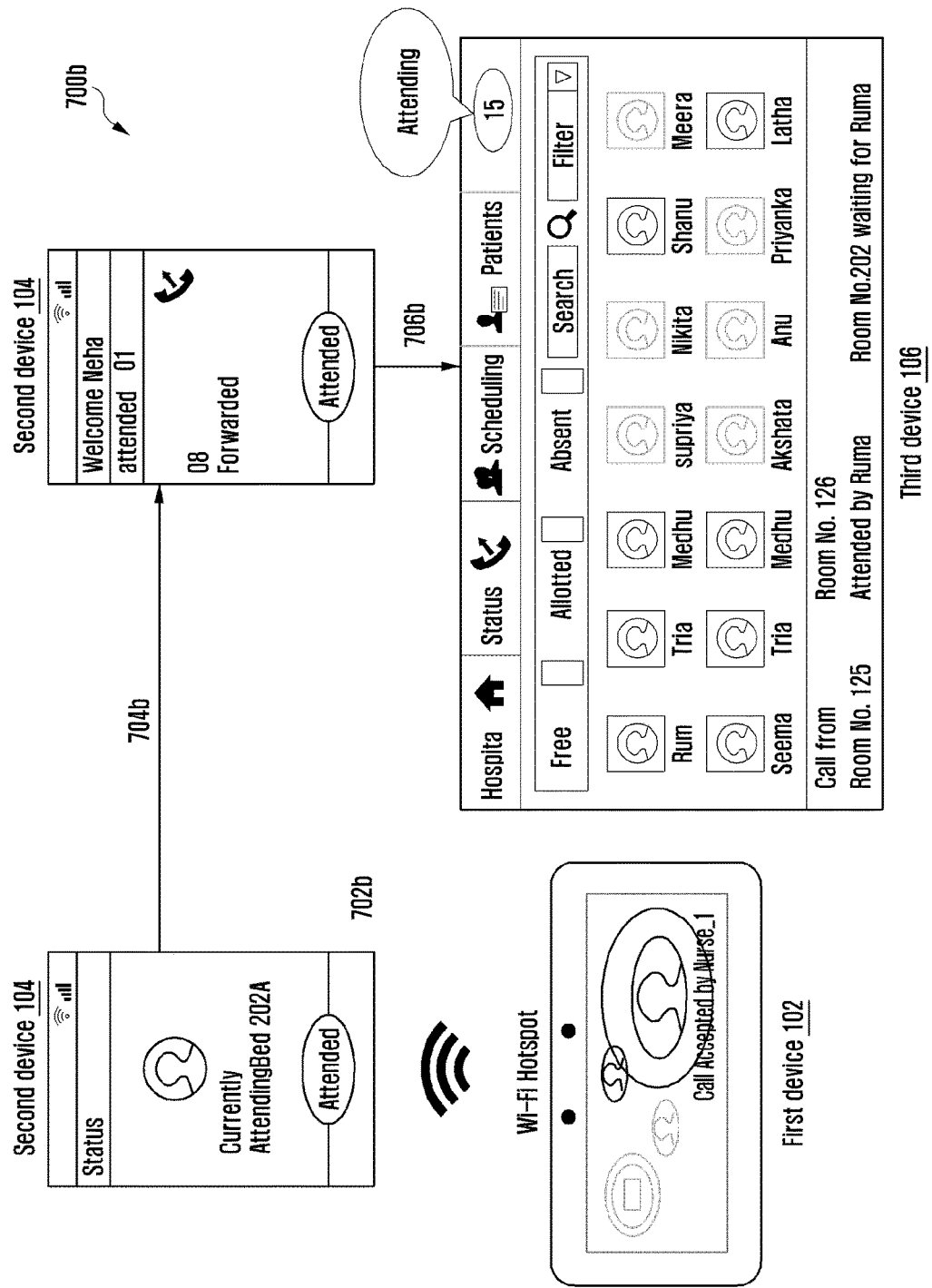
FIG. 7B is a schematic representation of a process of tracking location of a second device when the second device becomes out of proximity from the first device, according to an exemplary embodiment.

FIG. 7B is a schematic representation of a process 700b of tracking location of the second device 104 when the second device 104 becomes out of proximity from the first device 102, according to an exemplary embodiment. In an exemplary embodiment, consider the location tracking system 100 is implemented in the hospital. In this scenario, the first device 102 corresponds to the patient device, the second device 104 corresponds to the nurse device and the third device 106 corresponds to the centralized server. Consider that the nurse device has served the patient and left the room.

At step 702b, the nurse device keeps monitoring the hotspot signal of the patient device.

At step 704b, the nurse device determines that the signal strength of the hotspot signal is lesser than the predetermined threshold and hence detects a weak signal strength. The nurse device then informs the centralized server that the nurse has moved out of the patient room and hence, the nurse device terminates the session with the centralized server for the patient. The display screen of the nurse device now indicates that the nurse has attended one patient.

At step 706b, the centralized server receives the location information of the nurse device indicating that the nurse has moved out of the patient's room and accordingly updates the status of the nurse associated with the nurse device in the database 212c. This information in the database is fetched by the patient's device, as the patient device keeps switching from the Wi-Fi mode to the hotspot mode. On receiving the "Attended" information, the switching stops on the patient's device. Each time the third device 106 receives a new notification from either the first device 102 or the second device 104, the display screen of the third device 106 displays a pop-up box indicating the new notification. For example, the pop up indicates number of updates received from the first device 102 or the second device 104, and the status of wireless call associated with each second device 104.

Figure 8:
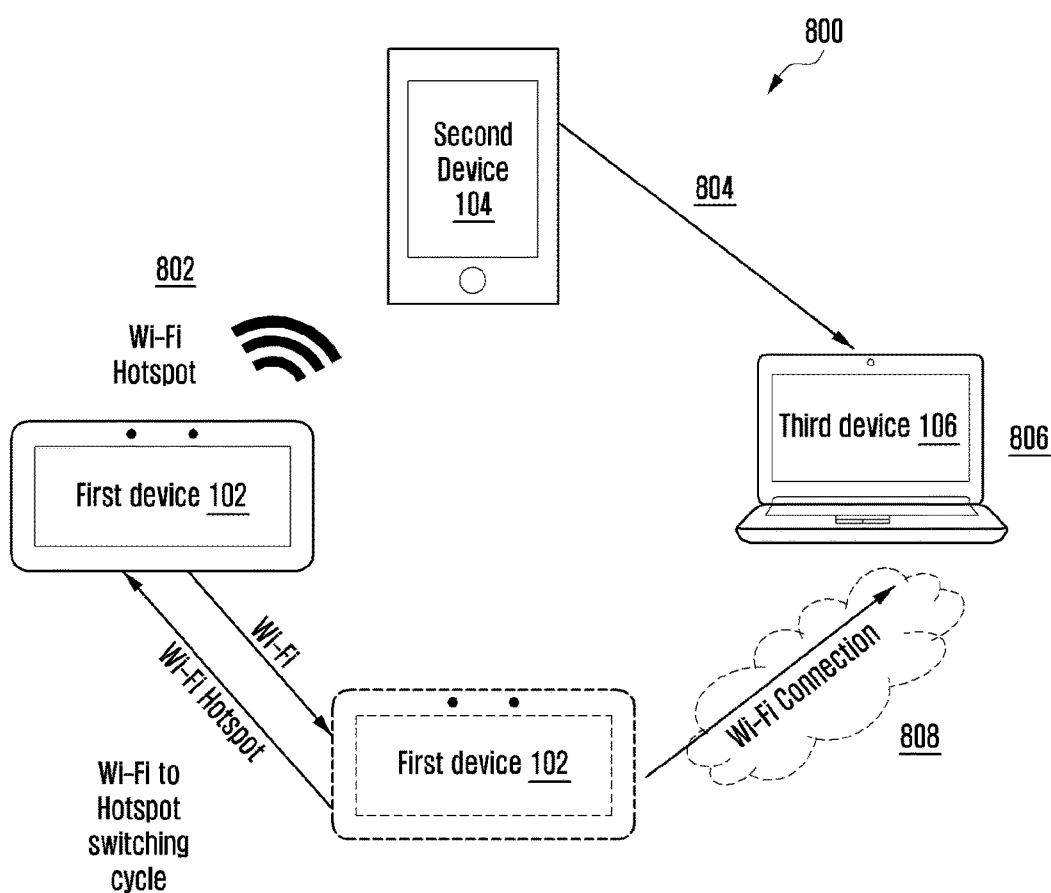
FIG. 8 is a schematic representation of a process of switching by a first device from a first wireless mode to a hotspot mode and vice versa, according to an exemplary embodiment.

FIG. 8 is a schematic representation of a process 800 of switching by the first device 102 from the first wireless mode to the hotspot and vice versa, according to an exemplary embodiment. At step 802, the first device 102 broadcasts the hotspot signal in the hotspot mode to the plurality of devices in the location tracking system 100. At step 804, the second device 104 scans hotspot range of the first device 102 corresponding to the MAC address and notifies the third device 106 for its presence and time spent. The second device 104 scans the Wi-Fi signal strength corresponding to particular MAC address.

At step 806, the third device 106 receives the location information of the second device 104 and further monitors the location and time spent by the second device 104. In an exemplary embodiment, the second device 104 may also send the status to the third device 106 via a HTTP request and the third device 106 may show the current location of the second device 104 and monitor the time for which nurse serves the patient. The second device 104 may send the information Staff ID, Call ID, Message Type (e.g., "Call Closed in this Case"), or the like to the third device 106.

In an exemplary embodiment, the first device 102 is in the Wi-Fi mode in which the first device 102 is connected to the Wi-Fi network. The functionality of the first device 102 in the Wi-Fi mode is performed by using Wi-Fi connection such that the first device 102 constantly enquires the third device 106 about the current location status of the second device 104. In the hotspot mode, the first device 102 constantly broadcasts the hotspot signal to the plurality of devices in the location tracking system 100. In an exemplary embodiment, the first device 102 then switch to Wi-Fi and then ping the third device 106 again for the current location of the nurse and when the first device 102 detects that the nurse has served the patient, the first device 102 closes the call.

In an exemplary scenario, guests can be provided a dashboard for access to services of a hotel over the apparatus which can be, but not limited to a smartphone. Using the methods according to exemplary embodiments, the guests can call for a room service staff, who can visit to serve the guest, by using a smartphone. Presence status and duration of a stay of the guest in the room can be tracked by the methods according to the exemplary embodiments.

Figure 9:
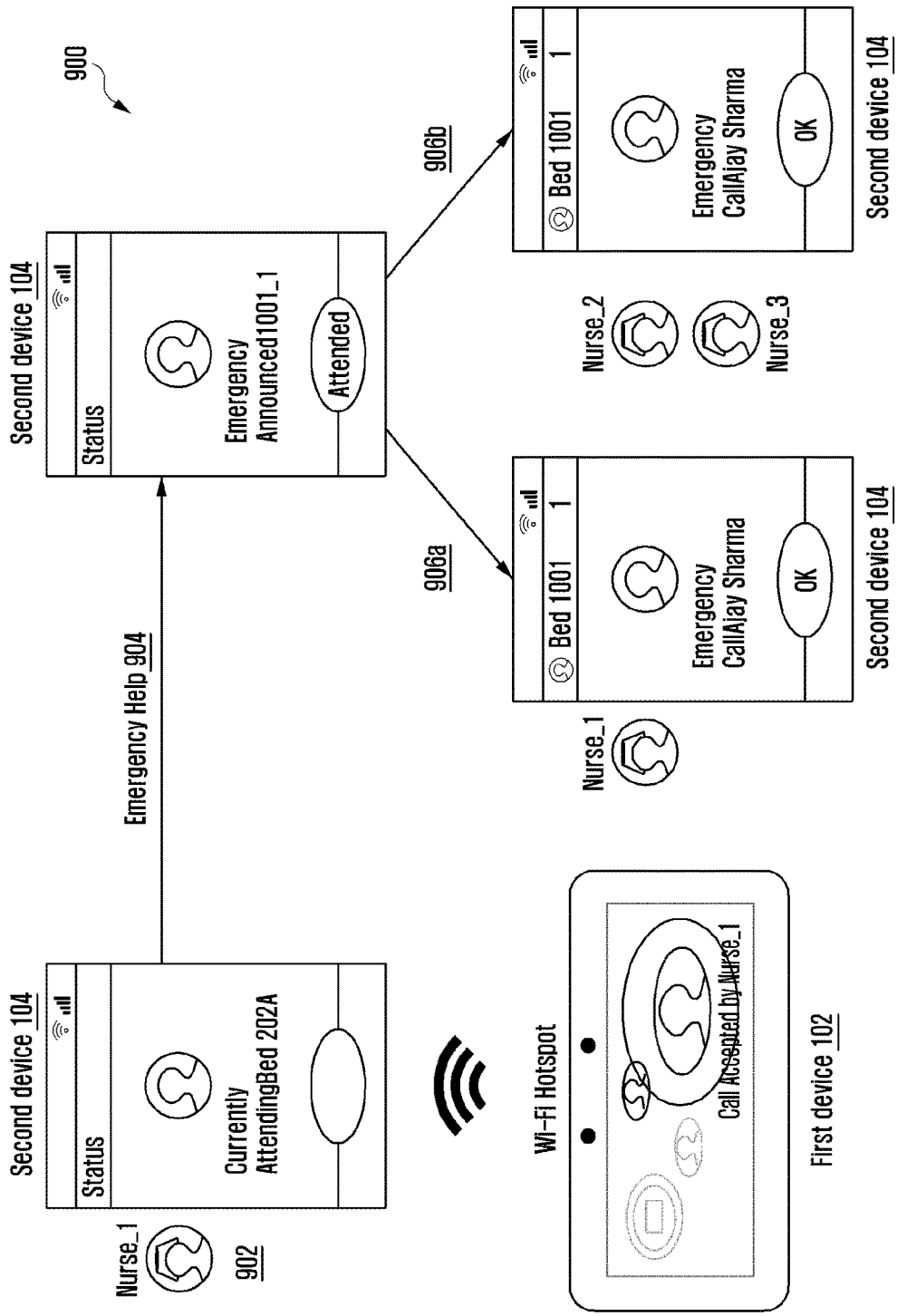
FIG. 9 is a schematic representation of a process of tracking location of a second device during an emergency situation, according to an exemplary embodiment.

FIG. 9 is a schematic representation of a process 900 of tracking location of the second device 104 during an emergency situation, according to an exemplary embodiment. In a exemplary n embodiment, the patient device starts the wireless call using the first wireless mode with the centralized server to seek attention from the nurse. The centralized server forwards the incoming wireless call to the allotted nurse device using the second wireless mode. The allotted nurse device accepts the incoming wireless call from the centralized server indicating that the patient seeks attention. At step 902, the nurse device identifies that the nurse has reached the patient's room based on the signal strength of the hotspot signal broadcasted by the patient device and hence accordingly informs the centralized server that the nurse device is in proximity to the patient device using the second wireless mode. As soon as the nurse device informs the centralized server that the nurse device is in proximity to the patient device, the display screen of the nurse device displays a dialog box indicating the nurse status as "currently attending the patient".

At step 904, if the nurse realizes that the patient is in an emergency situation when the nurse enters the patient's room, the nurse may notify the emergency situation through the nurse device of the nurse to the centralized server based on the priority of the patient.

At step 906, the nurse device broadcasts an emergency request to a plurality of nurse devices of the same team as well as to the nurses devices which are in close proximity range with the patient. The emergency request sent by the nurse device may be first sent to the centralized server and then the centralized server identifies the emergency, identifies the plurality of nurse devices of the same team and the nurse device which are in close proximity of the patient and then forwards the emergency request to the identified nurse devices. The emergency request may include details of the patient, kind of emergency, and location of the patient.

In an exemplary embodiment, the display screen of the nurse device who has notified emergency is depicted at 906*a* and the display screens of the nurse devices which have received this emergency requests are depicted at 906*b*.

Figure 10:
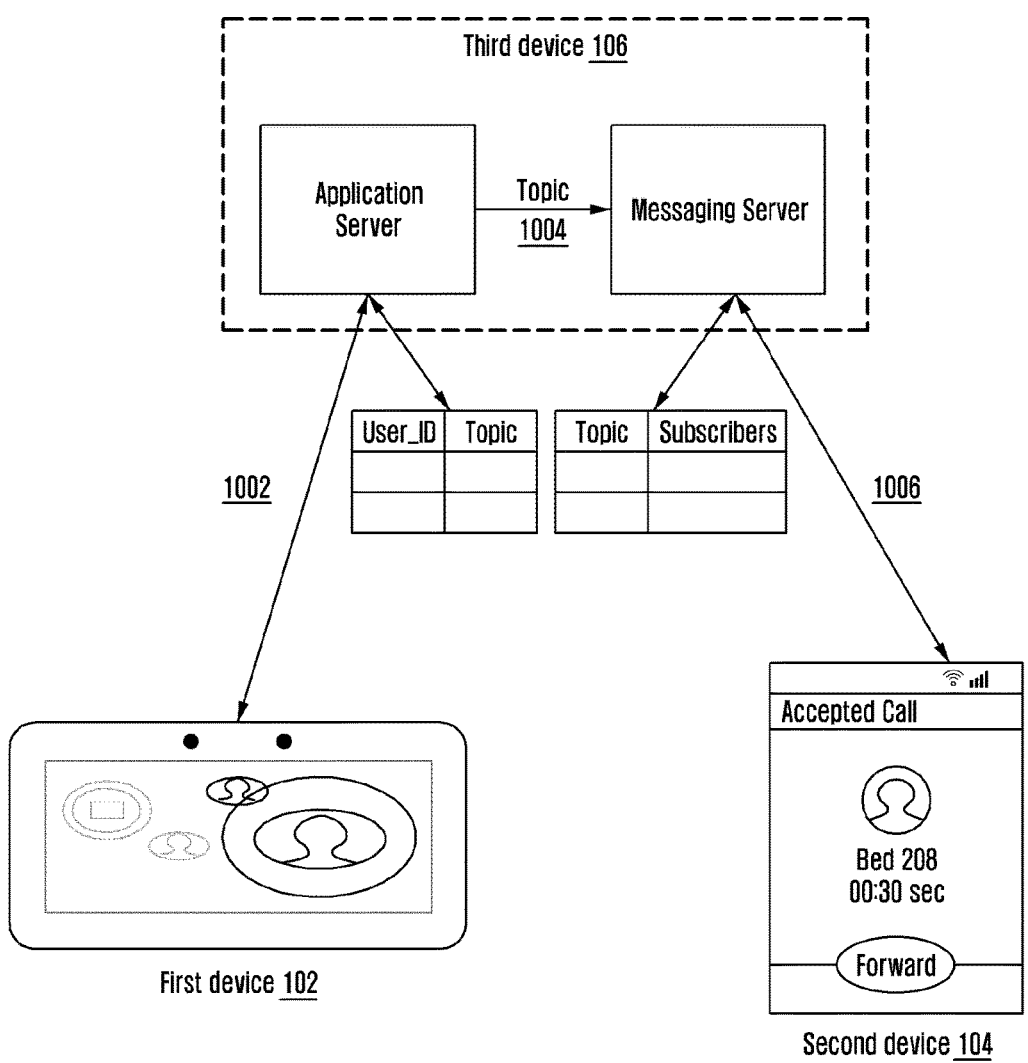
FIG. 10 illustrates example operations performed by a system implementing subscriber-publisher pattern when a call from a first device to a second device.

FIG. 10 illustrates example operations performed by the system implementing subscriber-publisher pattern when a call from the first device 102 (for example, patient device) to the second device 104 (for example, nurse device). In an exemplary embodiment, at 1002, the patient may send one or more parameters to the application server through a HTTP request. The parameters described herein can include, for example, Patient ID, Message Type (to indicate that it is initiating call), Mac Address (which nurse will scan to detect the range), or the like. At 1004, the application server may search the nurse allocated to that particular patient and then fetch the topic from database which that particular nurse has been subscribed. The application server then creates a message including one or more fields and send the message to a messaging server. The fields described herein can be, for example, Call initiated time, Patient ID, Message Type (e.g., "call initiated"), Call ID (generated by the application server), Mac Address of the patient, Nurse ID, or the like. At 1006, the messaging server may find all the subscribers subscribed to that particular topic (e.g., nurses) from the database and push the message to those subscribers.

Figure 11:
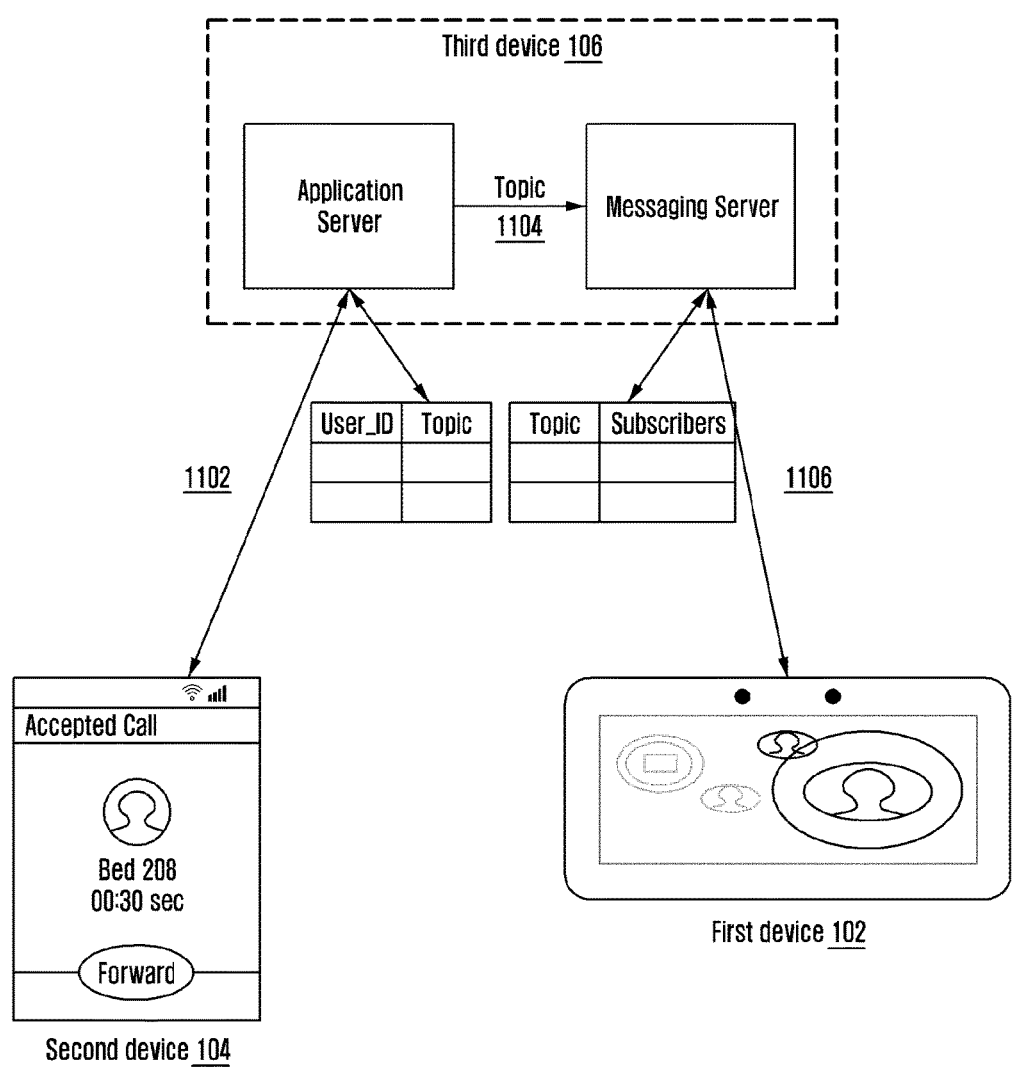
FIG. 11 illustrates example operations performed by a system implementing subscriber-publisher pattern to provide notifications from a second device to a first device.

FIG. 11 illustrates example operations performed by the system implementing subscriber-publisher pattern to provide notifications from the second device 104 (for example, nurse device) to the first device 102 (for example, patient device). In an exemplary embodiment, at 1102, after receiving a call on the nurse device, The nurse may accept the call and send the fields such as Nurse ID, Call ID (e.g., corresponding to the caller), Message Type (e.g., "Accepted"), or the like to the application server.

At 1102, the application server may search the topics corresponding to the head nurse ID and, patient ID related to the call ID from the database. Further, the application server can send the information such as Call Initiated Time, Nurse ID, User Type (e.g., Nurse, Head Nurse, Patient), Message Type (e.g., "Accepted"), Nurse information (such as name, gender, or the like), Patient ID to whom message will be sent, Head Nurse ID (to notify the head nurse that nurse has accepted the call), or the like to the messaging broker. At 1106, the messaging server may find all the subscribers subscribed to that particular topic (e.g., patient and head nurse) from the database and push the message to the subscribers.

Figure 12:
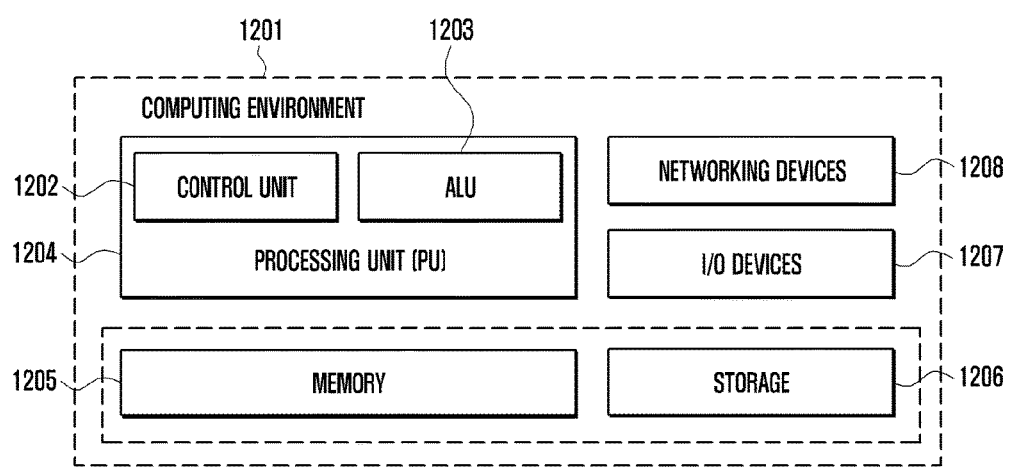
FIG. 12 is block diagram of a computing environment implementing the method for tracking location, according to an exemplary embodiment.

FIG. 12 is block diagram of a computing environment 1200 implementing the method for tracking location, according to an exemplary embodiment. As depicted in FIG. 12, the computing environment 1200 comprises at least one processing unit (or processor) 1202 that is equipped with a controller 202 and an arithmetic logic unit (ALU) 1212, a memory 1204, a storage 1206, plurality of networking devices 1208, and a plurality Input output (I/O) devices 1210. The computing environment 1200 may include other functional components not shown in the figure but can be understood by a person skilled in the art.

The processing unit 1202 is responsible for processing the instructions of the method. The processing unit 1202 receives commands from the controller 202 to perform its processing. Further, any logical and arithmetic operations involved in the execution of the instructions are computed with the help of the ALU 1212. The method comprising of instructions and codes required for the implementation are stored in either the memory unit 1204 or the storage 1206 or both. At the time of execution, the instructions may be fetched from the corresponding memory 1204 or storage 1206, and executed by the processing unit 1202. The processing unit 1202, as used herein, refers to any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processing unit 1202 may also include embedded controllers, such as generic or programmable logic devices or arrays, application specific integrated circuits, single-chip computers, smart cards, or the like.

The memory 1204 may be volatile memory and non-volatile memory. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, or the like.

The storage 1206 is configured for storing the location information received from the third device 106. The storage 1206 may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, or the like.

Exemplary embodiments may be implemented in conjunction with modules, including functions, procedures, data structures, and application programs, for performing tasks, or defining abstract data types or low-level hardware contexts. The controller 202 may be stored in the form of machine-readable instructions on any of the above-mentioned storage media and may be executed by the processing unit 1202. For example, a computer program may include machine-readable instructions, that when executed by the processing unit 1202 cause the processing unit 1202 to perform the process of tracking location according to the teachings and herein described embodiments of the present subject matter. In one embodiment, the computer program may be included on a compact disk-read only memory (CD-ROM) and loaded from the CD-ROM to a hard drive in the non-volatile memory.

In case of any hardware implementations various networking devices 1208 or external I/O devices 1210 may be connected to the computing environment to support the implementation through the networking unit and the I/O device unit.

The exemplary embodiments disclosed herein can be implemented through at least one software program running on at least one hardware device and performing network management functions to control the elements. The elements shown in FIGS. 1 and 12 include blocks which can be at least one of a hardware device, or a combination of hardware device and software module.

The foregoing description of the specific embodiments will so fully reveal the general nature of the exemplary embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the exemplary embodiments herein have been described in terms of preferred embodiments, those skilled in the art will recognize that the exemplary embodiments herein can be practiced with modification within the spirit and scope of the exemplary embodiments.

What is claimed is:

1. A method of tracking a second electronic device by using at least one first electronic device, the method comprising:
    broadcasting, by the at least one first electronic device, a communication signal in a first short range wireless communication mode, the communication signal being received by the second electronic device;
    switching, by the at least one first electronic device, from the first short range wireless communication mode to a second short range wireless communication mode;
    receiving, by the at least one first electronic device in the second short range wireless communication mode, presence information of the second electronic device that is detected using the communication signal broadcasted in the first short range wireless communication mode, the presence information being received from a third electronic device that is different from the at least one first electronic device and the second electronic device, the presence information comprising information indicating (i) a non-proximity state of the second electronic device based on a strength of the communication signal, broadcasted in the first short range wireless communication mode and detected by the second electronic device, not exceeding a threshold and (ii) a proximity state of the second electronic device based on the strength of the communication signal, broadcasted in the first short range wireless communication mode and detected by the second electronic device, exceeding the threshold; and
    periodically switching, by the at least one first electronic device, between the first short range wireless communication mode and the second short range wireless communication mode according to a predetermined switching cycle; and
    maintaining the second short range wireless communication mode with termination of the predetermined switching cycle based on receiving the presence information in the second short range wireless communication mode,
    wherein the presence information of the second electronic device is transmitted from the second electronic device to the third electronic device based on a determination on whether the second electronic device is located within a certain range from the at least one first electronic device,
    wherein the determination in the second electronic device is based on the communication signal that is broadcasted in the first short range wireless communication mode, and
    wherein the periodically switching comprises periodically identifying whether the presence information of the second electronic device is received in the second short range wireless communication mode, and periodically requesting the third electronic device to update the presence information of the second electronic device in response to identifying that the presence information of the second electronic device is not received in the second short range wireless communication mode.

2. The method of claim 1, wherein the first short range wireless communication mode comprises a hotspot mode in which a hotspot signal is broadcasted, and the second short range wireless communication mode comprises a Wi-Fi mode.

3. The method of claim 1, further comprising:
    transmitting a request for the presence information of the second electronic device to the third electronic device, and
    wherein the receiving comprises receiving, in response to the request, the presence information of the second electronic device from the third electronic device.

4. The method of claim 1, wherein the broadcasting comprises:
    switching, by the at least one first electronic device, from the second short range wireless communication mode to the first short range wireless communication mode and broadcasting the communication signal in the first short range wireless communication mode.

5. The method of claim 4, further comprising, prior to the broadcasting, performing:
    transmitting a request for the presence information of the second electronic device to the third electronic device in the second short range wireless communication mode, and
    wherein the receiving comprises receiving the presence information of the second electronic device from the third electronic device in the second short range wireless communication mode.

6. An electronic device comprising:
    a communication module; and
    a controller connected with the communication module and configured to:
        broadcast a communication signal in a first short range wireless communication mode, the communication signal being received by a second electronic device,
        perform switching from the first short range wireless communication mode to a second short range wireless communication mode,
        receive, in the second short range wireless communication mode, presence information of the second electronic device that is detected using the communication signal broadcasted in the first short range wireless communication mode, the presence information being received from a third electronic device that is different from the electronic device and the second electronic device, the presence information comprising information indicating (i) a non-proximity state of the second electronic device based on a strength of the communication signal, broadcasted in the first short range wireless communication mode and detected by the second electronic device, not exceeding a threshold and (ii) a proximity state of the second electronic device based on the strength of the communication signal, broadcasted in the first short range wireless communication mode and detected by the second electronic device, exceeding the threshold, periodically switch between the first short range wireless communication mode and the second short range wireless communication mode according to a predetermined switching cycle, and maintain the second short range wireless communication mode with termination of the predetermined switching cycle based on receiving the presence information in the second short range wireless communication mode, and periodically identify whether the presence information of the second electronic device is received in the second short range wireless communication mode, and periodically request the third electronic device to update the presence information of the second electronic device in response to identifying that the presence information of the second electronic device is not received in the second short range wireless communication mode, wherein the presence information of the second electronic device is transmitted from the second electronic device to the third electronic device based on a determination on whether the second electronic device is located within a certain range from the electronic device, and wherein the determination in the second electronic device is based on the communication signal that is broadcasted in the first short range wireless communication mode.

7. The electronic device of claim 6, wherein the first short range wireless communication mode comprises a hotspot mode in which a hotspot signal is broadcasted, and the second short range wireless communication mode comprises a Wi-Fi mode.

8. The electronic device of claim 6, wherein the controller is further configured to:

transmit a request for the presence information of the second electronic device to the third electronic device, and receive, in response to the request, the presence information of the second electronic device from the third electronic device in the second short range wireless communication mode.

* * * * *